United States Patent
Kondrad et al.

(10) Patent No.: US 9,987,958 B2
(45) Date of Patent: Jun. 5, 2018

(54) QUICK DISCONNECT HEADREST

(71) Applicant: Ford Global Technologies, LLC, Dearborn, MI (US)

(72) Inventors: Marcos Silva Kondrad, Macomb Township, MI (US); Johnathan Andrew Line, Northville, MI (US); David Frederick Lyons, New Haven, MI (US); Nicholas Alphonse Billardello, Macomb, MI (US); Yalie Yan-rush, Plymouth, MI (US); Christian J. Hosbach, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 14/922,500

(22) Filed: Oct. 26, 2015

(65) Prior Publication Data

US 2017/0113583 A1    Apr. 27, 2017

(51) Int. Cl.
*A47C 1/10* (2006.01)
*B60N 2/48* (2006.01)

(52) U.S. Cl.
CPC ........... *B60N 2/4864* (2013.01); *B60N 2/865* (2018.02); *B60N 2/874* (2018.02); *B60N 2002/899* (2018.02)

(58) Field of Classification Search
CPC ....... B60N 2/4864; B60N 2/874; B60N 2/865
USPC ................................. 297/391–410
See application file for complete search history.

(56) References Cited

U.S. PATENT DOCUMENTS

| | | | | |
|---|---|---|---|---|
| 4,657,304 A | * | 4/1987 | Heesch | B60N 2/4864 297/391 |
| 4,762,367 A | * | 8/1988 | Denton | B60N 2/865 297/409 |
| 5,346,283 A | * | 9/1994 | Steininger | A47C 1/036 297/284.1 |
| 6,698,832 B2 | * | 3/2004 | Boudinot | B60N 2/4876 297/217.4 |
| 6,715,829 B2 | * | 4/2004 | Svantesson | B60N 2/865 297/216.12 |
| 6,805,411 B2 | * | 10/2004 | Gramss | B60N 2/4864 297/216.12 |
| 7,073,856 B2 | * | 7/2006 | Akaike | B60N 2/0232 297/216.12 |
| 7,195,313 B2 | * | 3/2007 | Hippel | B60N 2/4852 297/216.12 |

(Continued)

*Primary Examiner* — Syed A Islam
(74) *Attorney, Agent, or Firm* — Vichit Chea; Price Heneveld LLP

(57) ABSTRACT

A headrest assembly includes a linkage system with a first adjustment mechanism configured to power fore and aft movement of a mounting plate. A headrest bun is slideably coupled to the mounting plate and is vertically adjustable via a second adjustment mechanism. A telescoping cover assembly is operable between stowed and deployed positions and configured to substantially conceal the linkage system as the linkage system moves between extended and retracted positions. A disconnect clip includes a first portion disposed on one or more support posts configured to support the headrest assembly, and a second portion disposed on the seatback frame. Power is provided to the first and second adjustment mechanisms when the first portion of the disconnect clip is electrically coupled to the second portion of the disconnect clip.

18 Claims, 21 Drawing Sheets

(56) References Cited

U.S. PATENT DOCUMENTS

| | | | |
|---|---|---|---|
| 7,517,015 B2* | 4/2009 | Terada | B60N 2/4228 297/216.12 |
| 7,618,091 B2* | 11/2009 | Akaike | B60N 2/002 297/216.12 |
| 7,753,683 B2 | 7/2010 | Hofmockel | |
| 7,798,570 B2 | 9/2010 | Kwiecinski et al. | |
| 7,866,745 B2* | 1/2011 | Hirota | A47C 7/38 297/216.12 |
| 7,963,598 B2* | 6/2011 | Akaike | B60N 2/002 297/216.12 |
| 8,348,338 B2* | 1/2013 | Galecka | B60N 2/4808 297/216.12 |
| 8,534,760 B2 | 9/2013 | Kotz | |
| 8,616,633 B2* | 12/2013 | Truckenbrodt | B60N 2/865 297/216.12 |
| 8,657,378 B2* | 2/2014 | Kunert | B60N 2/4814 297/391 |
| 9,150,171 B2* | 10/2015 | Kim | B60R 16/03 |
| 9,315,130 B2* | 4/2016 | Kondrad | B60N 2/482 |
| 9,333,887 B2* | 5/2016 | Talamonti | B60N 2/4864 |
| 9,566,884 B2* | 2/2017 | Line | B60N 2/482 |
| 9,718,381 B2* | 8/2017 | Yoo | B60N 2/4829 |
| 2001/0028191 A1* | 10/2001 | Lance | A47C 7/38 297/410 |
| 2005/0077762 A1 | 4/2005 | Kraemer et al. | |
| 2006/0220434 A1 | 10/2006 | Schulz et al. | |
| 2006/0279114 A1* | 12/2006 | Toda | B60N 2/862 297/216.12 |
| 2009/0179474 A1* | 7/2009 | Reel | B60N 2/4814 297/391 |
| 2012/0001461 A1* | 1/2012 | Alexander | B60N 2/4873 297/216.12 |
| 2012/0280547 A1* | 11/2012 | Veine | B60N 2/4814 297/354.1 |
| 2016/0250953 A1* | 9/2016 | Yoo | B60N 2/4852 297/410 |

\* cited by examiner

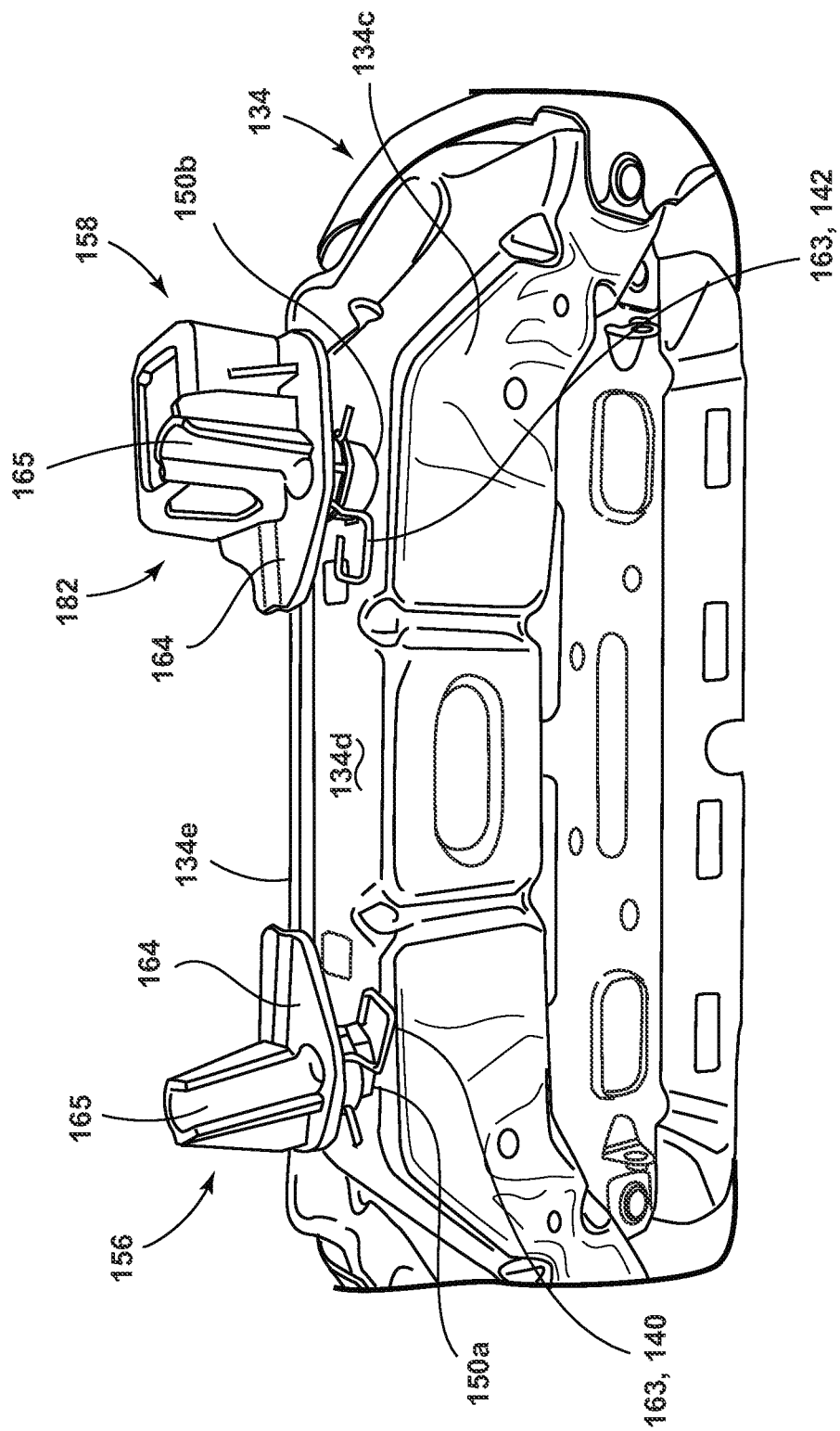

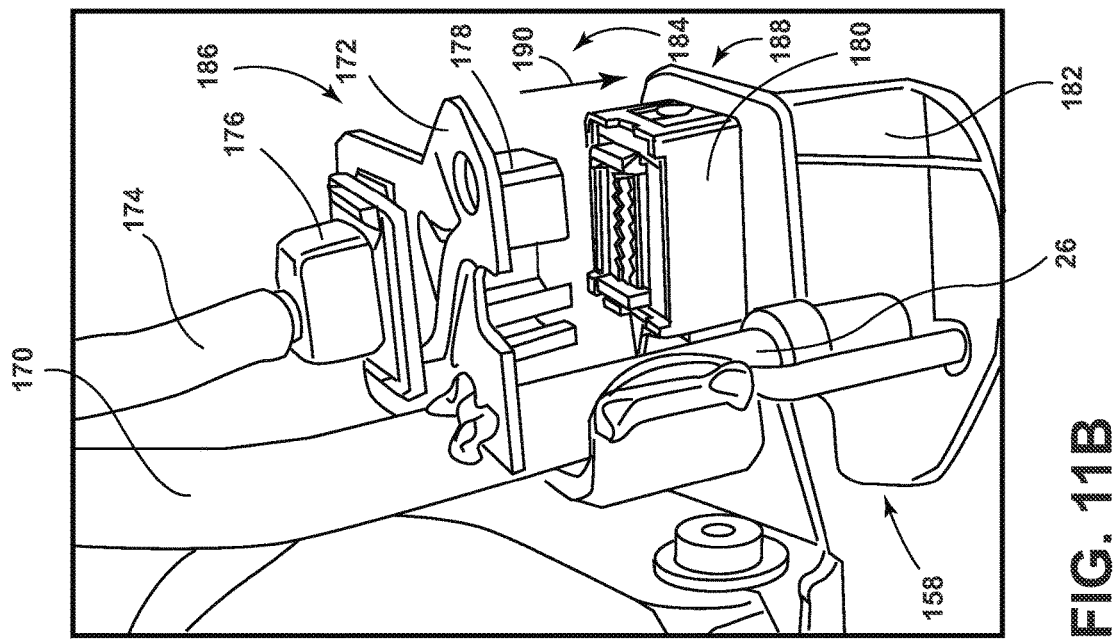
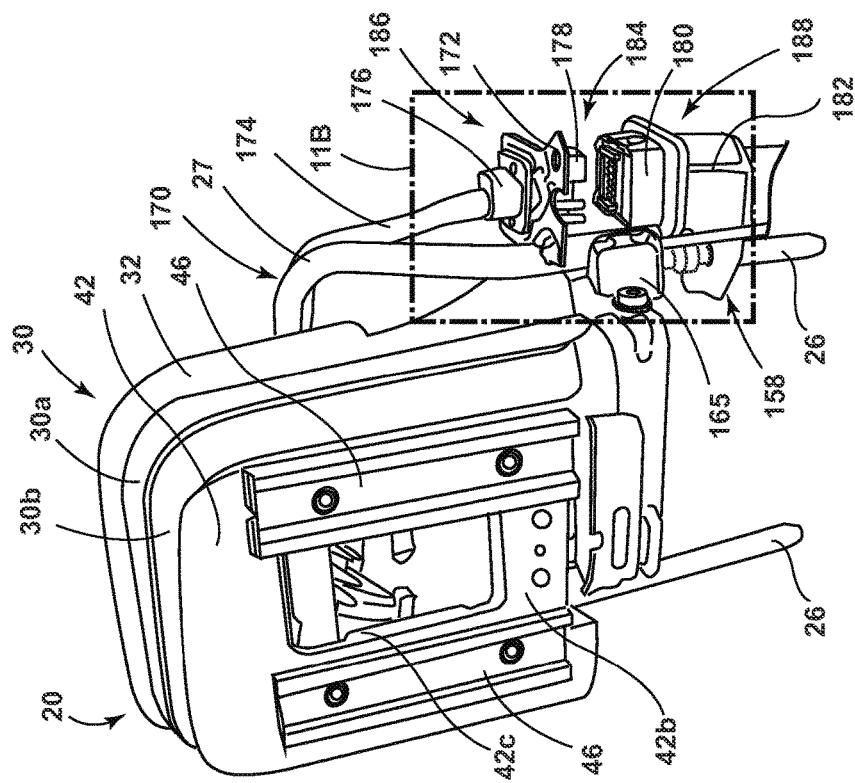
FIG. 11B
FIG. 11A

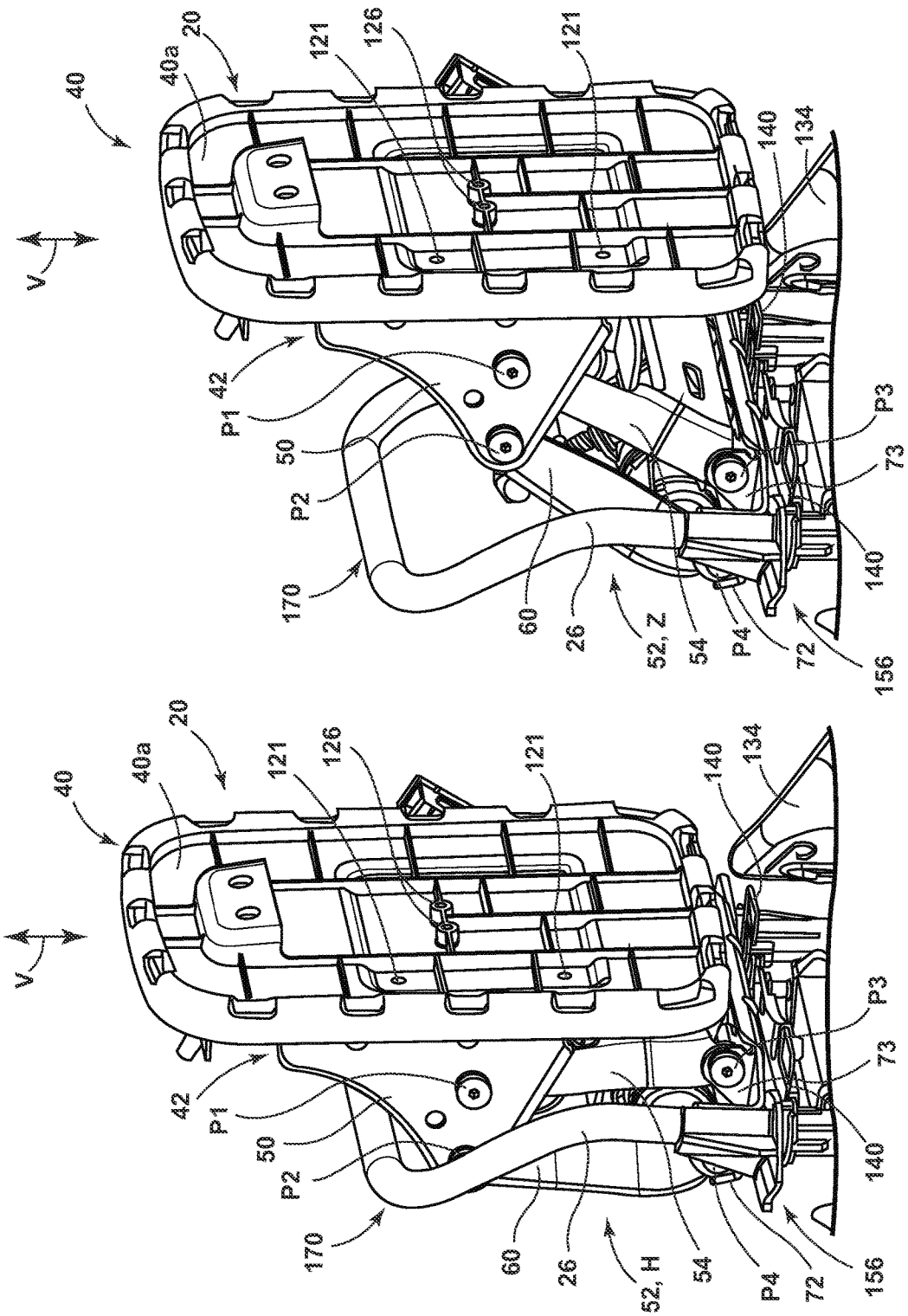

QUICK DISCONNECT HEADREST

FIELD OF THE INVENTION

The present invention generally relates to a headrest assembly, and more particularly, a quick disconnect adjustable headrest assembly having a headrest bun configured for both vertical and horizontal adjustment.

BACKGROUND OF THE INVENTION

There are a number of headrest designs within the automotive industry that provide movement of a headrest in various ways in an attempt to satisfy the multiple posture positions and different shapes of passengers seated in the vehicle seat. A headrest having multiple adjustments as well as quick assembly and disassembly is desired in order to satisfy the needs of the various vehicle occupants. The present invention provides multiple powered adjustments to meet the needs of various vehicle occupants, as well as quick disconnect of the headrest from the vehicle seat, while also providing necessary electrical connections therebetween.

SUMMARY OF THE INVENTION

One aspect of the present invention includes a vehicle seat assembly including a seatback having a seatback frame. One or more support posts are removeably received in a portion of the seatback frame. A headrest assembly is supported on the one or more support posts, and includes a linkage system having a mounting plate. The linkage system includes a first adjustment mechanism coupled to the linkage system for driving the linkage system between extended and refracted positions. A second adjustment mechanism is coupled to the mounting plate and further coupled to a headrest bun through an access aperture disposed through the mounting plate. The second adjustment mechanism is configured to drive the headrest bun between raised and lowered positions relative to the mounting plate. A disconnect clip includes a first portion disposed on the one or more support posts and a second portion disposed on the seatback frame. Power is provided to the first and second adjustment mechanisms when the first portion of the disconnect clip is electrically coupled to the second portion of the disconnect clip.

Another aspect of the present invention includes a headrest assembly having a linkage system with a first adjustment mechanism configured to power fore and aft movement of a mounting plate. A headrest bun is slideably coupled to the mounting plate. A second adjustment mechanism is operably coupled between the mounting plate and the headrest bun through an access aperture disposed through the mounting plate for powering vertical movement of the headrest bun relative to the mounting plate.

Yet another aspect of the present invention includes a headrest assembly having a linkage system with a base plate and a mounting plate pivotally interconnected by first and second pairs of spaced-apart links. An actuator is operably coupled to the linkage system for translating the linkage system between extended and retracted positions. A telescoping cover assembly is operable between stowed and deployed positions and configured to substantially conceal the linkage system as the linkage system moves between extended and retracted positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10C is a front perspective view of the first and second guide inserts of FIG. 10B being received in upper mounting apertures of the seatback frame member of FIG. 10A;

FIG. 11A is a rear perspective view of a headrest assembly having an electrical plug aligned with an electrical outlet of a seatback frame;

FIG. 11B is a perspective view of the electrical plug and outlet of FIG. 11A taken at location 11B;

FIG. 12A is a front perspective view of a headrest assembly with a rear trim cover and headrest bun removed to reveal a linkage system in a retracted position;

FIG. 12B is a front perspective view of the headrest assembly of FIG. 12A with the linkage system in an extended position;

DETAILED DESCRIPTION OF THE PREFERRED EMBODIMENTS

Figure 1:
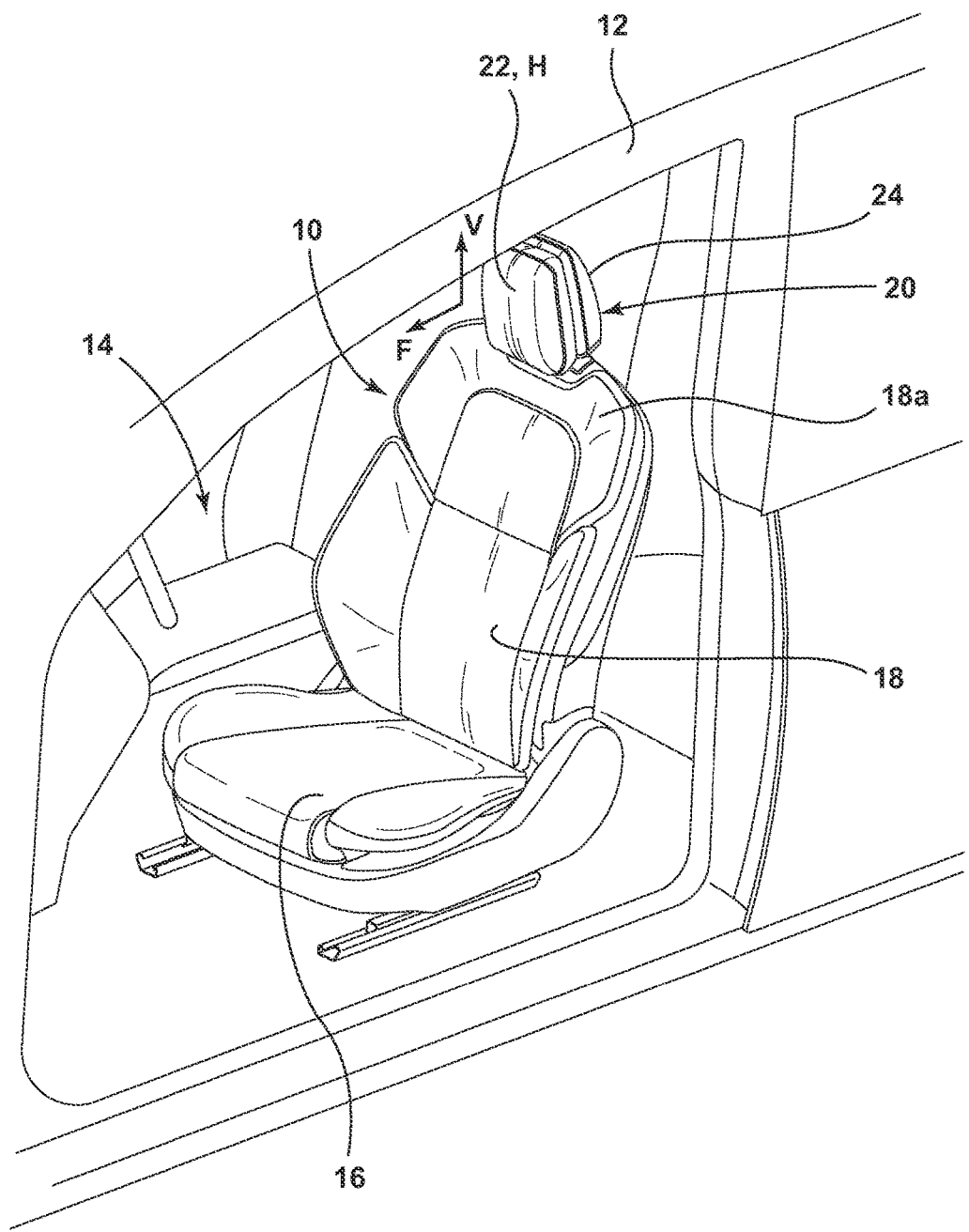
FIG. 1 is a front perspective view of a vehicle seat disposed in a vehicle interior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed in a vehicle 12 within a vehicle interior 14. The vehicle seat 10 includes a seat portion 16 which is coupled to a seatback 18. The seatback 18 includes an upper portion 18a having a headrest assembly 20 removably mounted thereon. The headrest assembly 20 includes a rear trim cover 24 and a headrest bun 22 which is contemplated to be a cushioned member configured to support the head of a vehicle occupant seated in the vehicle seat 10. The vehicle seat 10 of FIG. 1 is shown as a driver's side vehicle seat, however, it is contemplated that the headrest assembly 20 of the present invention may be disposed on any vehicle seat within a vehicle, including passenger seats, rear seats, folding seats and third row passenger seat options. As such, the headrest assembly 20 shown in FIG. 1 is not intended to limit the spirit of the invention as shown on a front driver's side vehicle seat 10.

The headrest assembly 20 is contemplated to be an adjustable headrest assembly, wherein the headrest bun 22 is contemplated to be adjustable in a forward direction, as indicated by arrow F between extended and retracted positions, and a vertical direction, as indicated by arrow V between raised and lowered positions, relative to the rear trim cover 24. In the position shown in FIG. 1, the headrest bun 22 is contemplated to be in a home position H which correlates to the headrest bun 22 being in the lowered vertical position and the retraced horizontal position, such that the headrest bun 22 is disposed directly adjacent to the rear trim cover 24. Movement of the headrest bun 22 is contemplated to be powered by one or more adjustment mechanisms, such that the headrest assembly 20 is also electrically coupled to a power supply of the vehicle, as further described below.

Figure 2A:
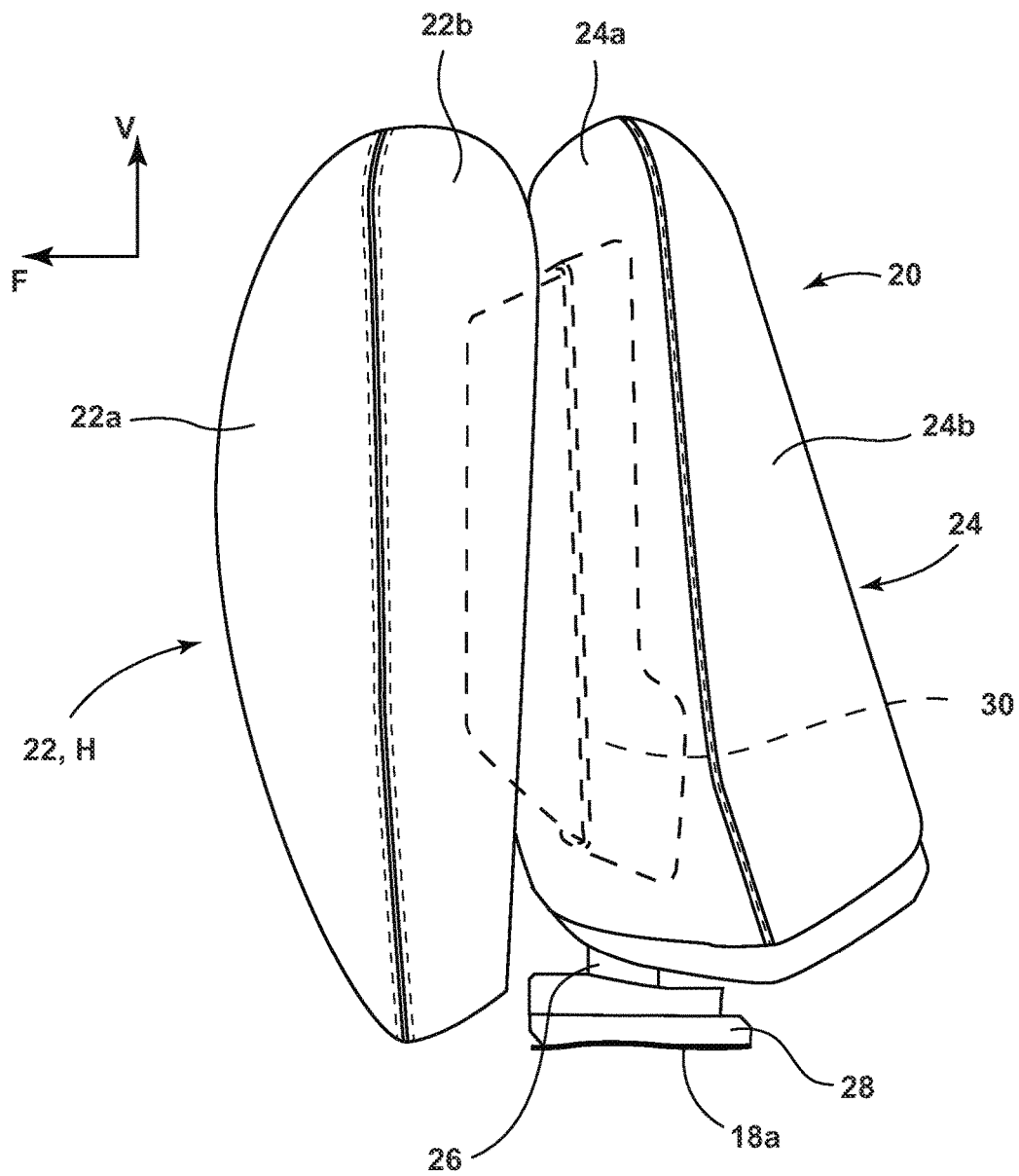
FIG. 2A is a side perspective view of a headrest according to an embodiment of the present invention.
Figure 2B:
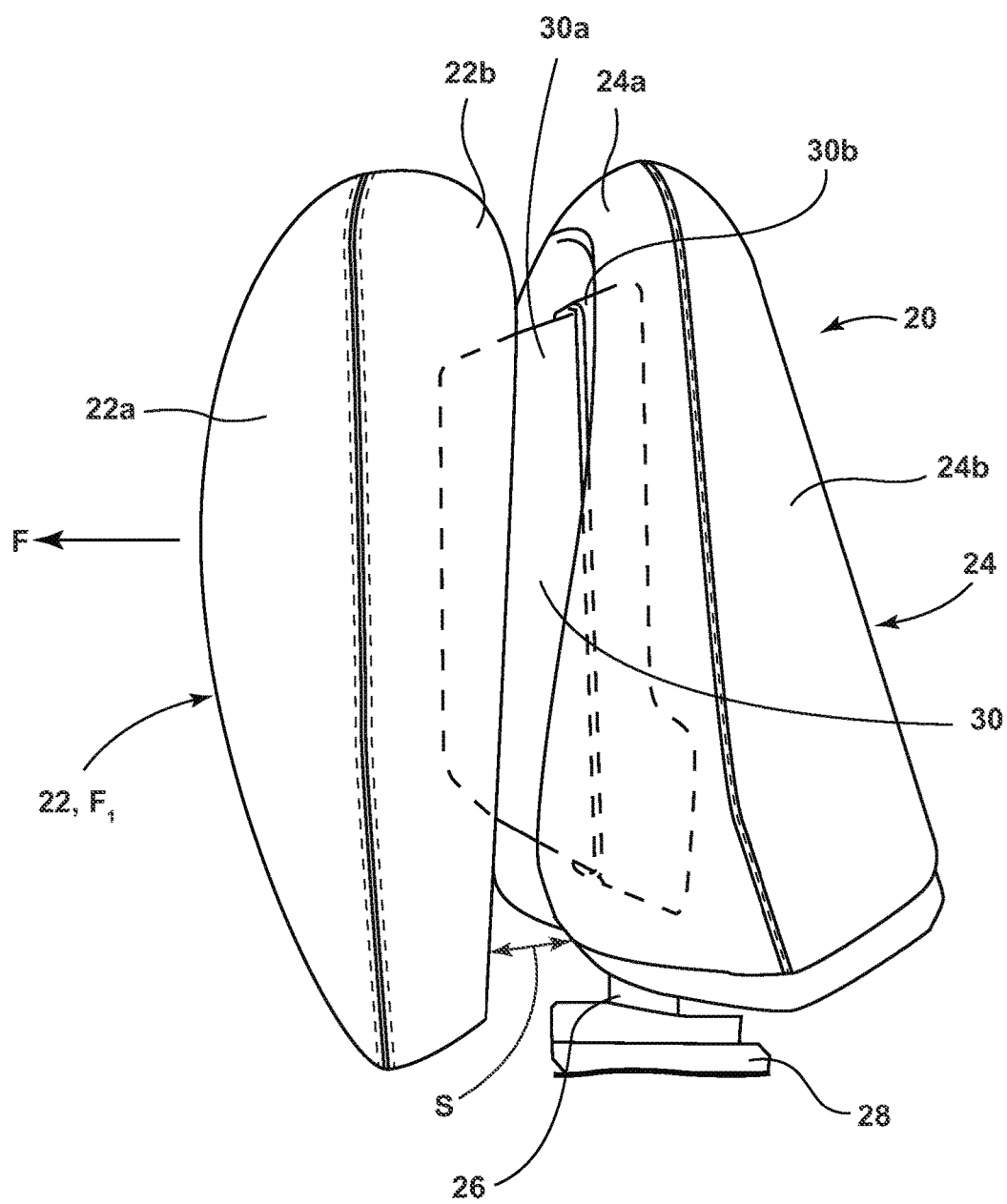
FIG. 2B is a side elevational view of the headrest of FIG. 2A showing the headrest bun in a forward position relative to FIG. 2A.
Figure 2C:
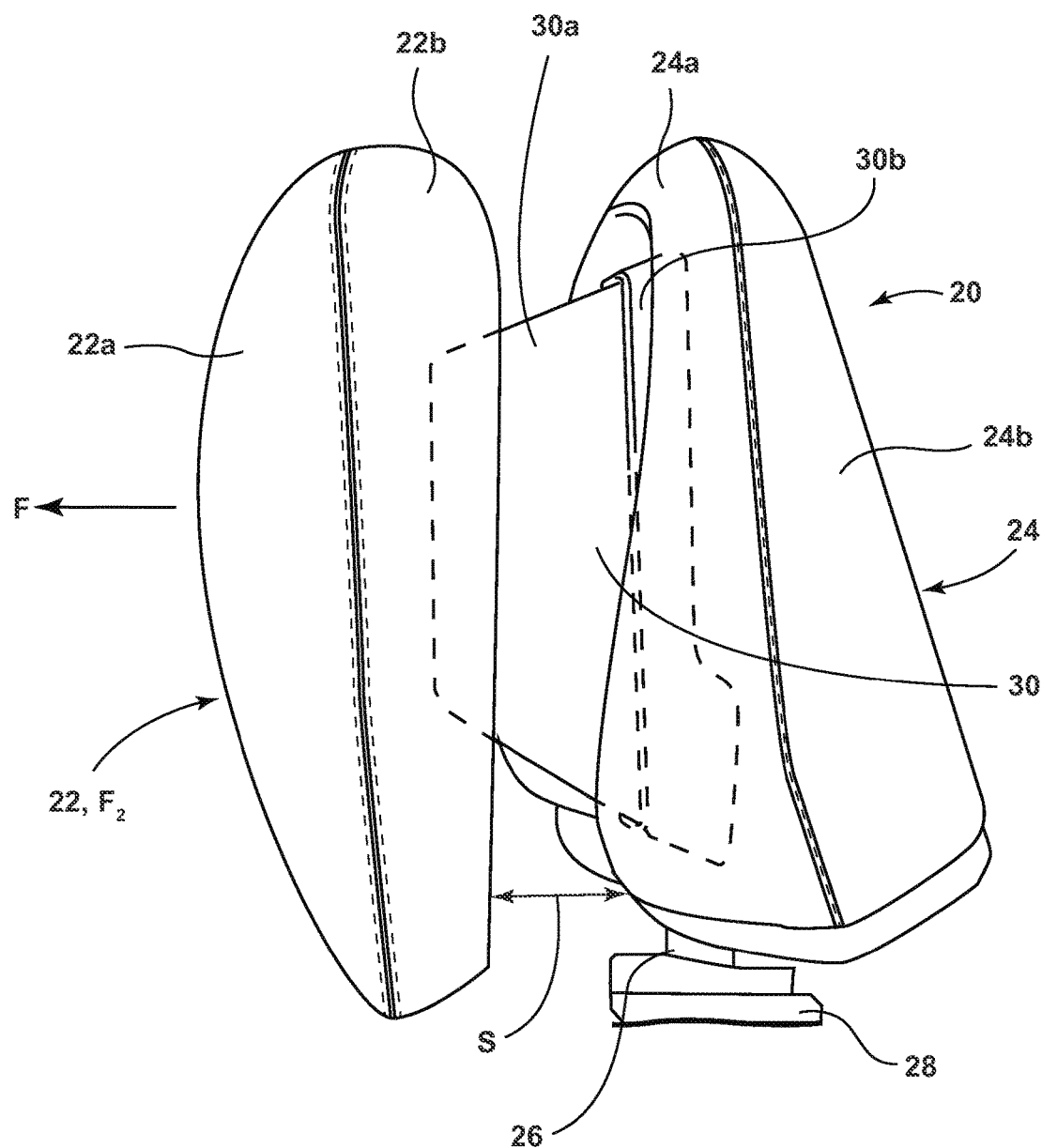
FIG. 2C is a side elevational view of the headrest of FIG. 2B showing the headrest bun in a forward position relative to FIG. 2B.

Referring now to FIG. 2A, the headrest assembly 20 is shown with the headrest bun 22 in the home position H relative to rear trim cover 24. The headrest bun 22 is a two-piece member having a cushioned front portion 22a and a rear portion 22b. The rear trim cover 24 is a two-piece member having front and rear portions 24a, 24b which are used to cover and surround various adjustment mechanisms and systems disposed within and concealed by the rear trim cover 24. The adjustment mechanisms are powered features used to move the headrest bun 22 as desired by a vehicle occupant. The headrest assembly 20 is supported by a support post 26 which is received in a seatback frame 28 of the vehicle seatback, such as seatback 18 shown in FIG. 1. The support post 26 is contemplated to be one of a pair of support posts that are configured to be vertically received by the seatback frame 28, and vertically adjustable as received therein. As further shown in FIG. 2A, a telescoping cover 30 is shown in phantom in a stowed position, and is operably coupled between the headrest bun 22 and the rear trim cover 24. The telescoping cover 30, as shown in FIGS. 2B and 2C is made visible as the headrest bun 22 moves forward in a direction as indicated by arrow F relative to the rear trim cover 24. The telescoping cover 30 is contemplated to be a plastic injection molded part that is configured to substantially conceal adjustment mechanisms and other components of the headrest assembly 20 when the headrest bun 22 is adjusted horizontally relative to the rear trim cover 24.

Referring now to FIG. 2B, the headrest bun 22 is shown in a forward position $F_1$, wherein the headrest bun 22 has moved in a car-forward direction as indicated by arrow F with respect to the rear trim cover 24. Thus, as shown in FIG. 2B, the rear portion 22b of headrest bun 22 is shown spaced away from the front portion 24a of the rear trim cover 24. With a spacing S between the rear portion 22b of the headrest bun 22 and the front portion 24a of the rear trim cover 24, the telescoping cover 30 can be seen having a front portion 30a and a rear portion 30b. It is contemplated that the front portion 30a can nest within the rear portion 30b, or vice versa, such that the telescoping cover 30 can telescopingly extend in a horizontal manner as the headrest bun 22 is driven away from the rear trim cover 24 in a direction as indicated by arrow F. Thus, the front portion 30a is contemplated to be partially received in the rear portion 30b of the telescoping cover 30 when the headrest bun is in the retracted position (FIG. 2A). The telescoping cover 30 is coupled to the headrest bun 22 at front portion 30a, and coupled to the rear trim cover 24 at rear portion 30b. In this way, the telescoping cover 30 is a slave to the movement of the headrest bun 22 and acts as a two-piece gap hider for the headrest assembly 20.

Referring now to FIG. 2C, the headrest bun 22 of the headrest assembly 20 is shown in a position $F_2$, which is contemplated to be a full extension of the headrest bun 22 in the direction as indicated by arrow F relative to the rear trim cover 24. In FIG. 2C, the front portion 30a of the telescoping cover 30 is more clearly shown given the increased spacing S between the rear portion 22b of the headrest bun 22 and the front portion 24a of the rear trim cover 24. Thus, in FIG. 2C, relative to FIG. 2A, the telescoping cover 30 has moved from a stowed position to a deployed position. As shown in FIG. 2C, the headrest assembly 20 of the present invention provides a large range of extension of the headrest bun 22 in a forward direction F relative to the rear trim cover 24, thereby providing enhanced comfort for a vehicle occupant. As further shown in FIG. 2C, while the headrest bun 22 is in the forward most position $F_2$, the adjustment mechanisms of the headrest assembly 20, that provide for this horizontal extension, are substantially concealed by the telescoping cover 30 and the rear trim cover 24. With the adjustment mechanisms concealed, the headrest assembly 20 of the present invention provides for a more pleasing aesthetic relative to adjustable headrest assemblies known in the marketplace. Thus, the telescoping cover 30 is operable between extended and nested positions (FIGS. 2A and 2C, respectively) depending on the extended position of the headrest bun 22. It is contemplated that the headrest bun 22 can move forward relative to the rear trim cover 24 about 50 mm to position $F_2$ from home position H. Other ranges of forward movement are also contemplated.

Figure 3A:
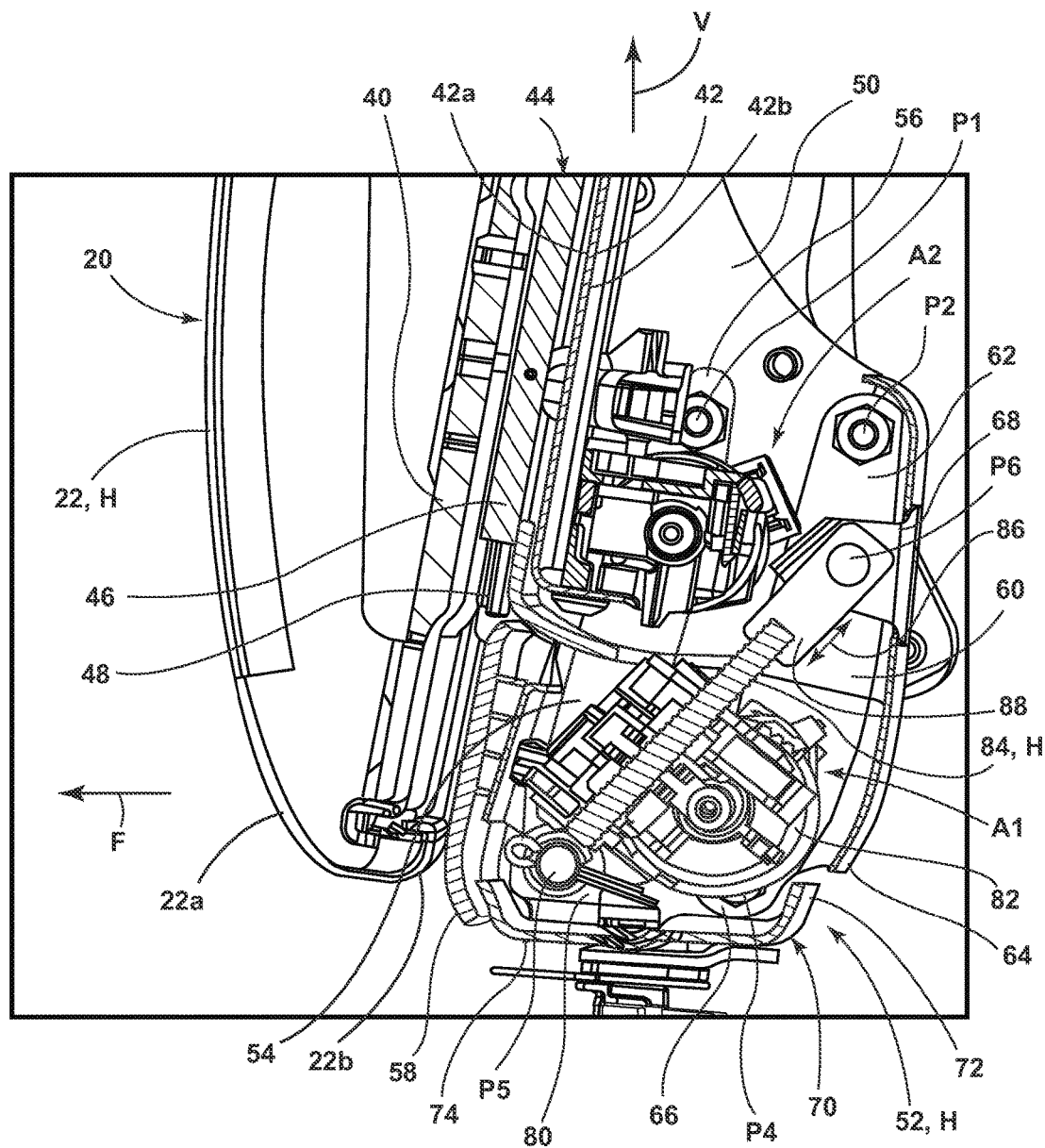
FIG. 3A is a cross-sectional view showing independent adjustment mechanisms disposed in a headrest assembly.

Referring now to FIG. 3A, a cross-section of the headrest assembly 20 is shown having the headrest bun 22 is the home position H with rear trim cover 24 removed to reveal the adjustment mechanisms configured to power movement of the headrest bun 22. The headrest bun 22 is shown coupled to a support plate 40 which is adjustably coupled to a mounting plate 42 disposed within the rear trim cover 24. The headrest bun 22 is vertically adjustable along the path as indicated by arrow V by a channel and rail arrangement 44 disposed between the support plate 40 and mounting plate 42. As shown in FIG. 3A, a channel 46 is coupled to the mounting plate 42 on a front side 42a thereof, and configured to slideably receive a rail 48 therein. The rail 48 is coupled to the support plate 40. As slideably received within in the channel 46, the rail 48 acts as a guide for the vertical movement of the headrest bun 22 along the path as indicated by arrow V. The channel and rail arrangement 44 between the headrest bun 22 and the mounting plate 42 is contemplated to be an arrangement having multiple channels and multiple rails received therein, as further described below. Vertical movement of the headrest bun 22 is contemplated to be powered by an adjustment mechanism, shown in the form of a second actuator A2, as further described below.

Figure 5:
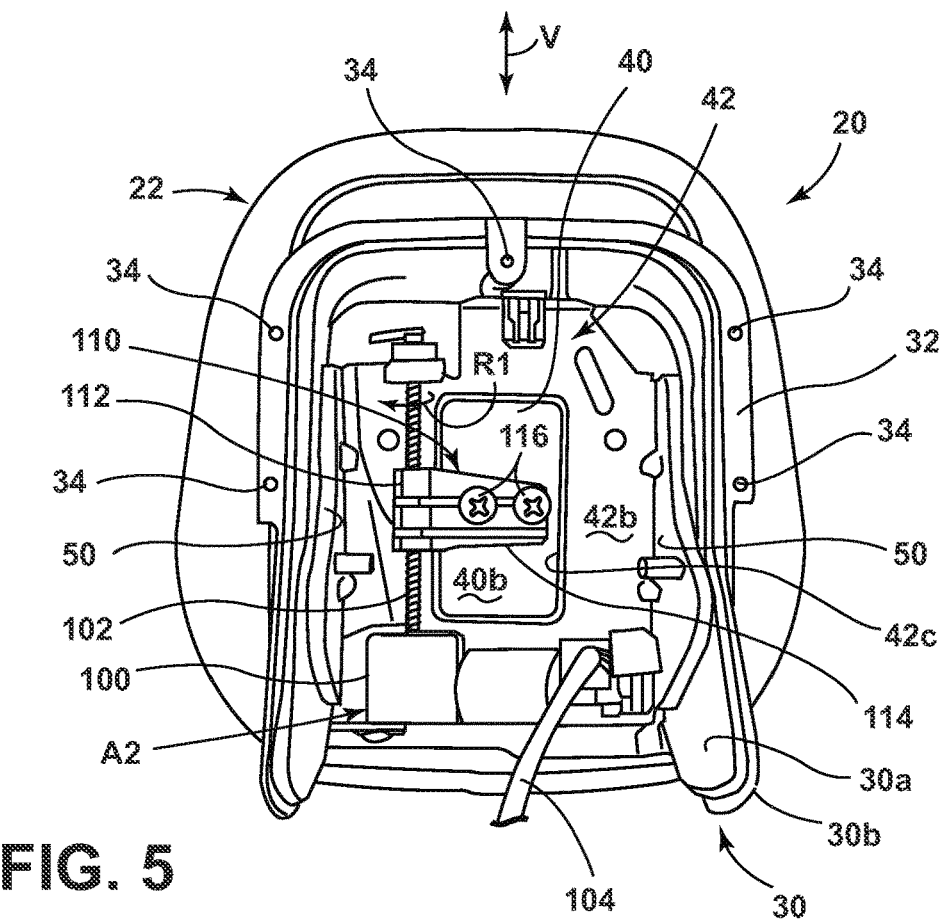
FIG. 5 is a rear elevational view of a headrest bun and mounting plate.

The mounting plate 42 further includes a rear side 42b having outwardly extending brackets 50. The brackets 50 are contemplated to be twin brackets which rearwardly extend from the rear side 42b of the mounting plate 42 as best shown in FIG. 5. The brackets 50 serve as a pivoting attachment location for a linkage system 52. Given the cross-sectional view of FIG. 3A, only a portion of the linkage system 52 is shown, however, it is contemplated that the linkage system 52 will be understood by one of ordinary skill in the art as shown in FIG. 3A, as well as other related views described further below. The linkage system 52 may be a four bar linkage system having various sized links. One or more links may have multiple pivoting locations to provide a multiple link system operating as a reinforced four bar linkage between fore and aft positions. The linkage system 52 is contemplated to translate the headrest bun 22 between an extended position E, as shown in FIG. 3D, and a recessed or home position H, as shown in FIG. 3A. The linkage system 52 is comprised of a plurality of links which are rigid members pivotally connected to one another as further described below with reference to FIGS. 3A-3D.

The linkage system 52 includes a front or first link 54, which may be described as an output link, having an upper portion 56 which is pivotally coupled to the bracket 50 of mounting plate 42 at pivot point P1. The first link 54 is contemplated to be one of a pair of front links which are interconnected by a cross member 58. A second or rear link 60, which may be described as an input link, is further shown in FIG. 3A having an upper portion 62 which is pivotally coupled to bracket 50 of the mounting plate 42 at pivot point P2. Much like the first link 54, the second link 60 is contemplated to be one of a pair of rear links which are interconnected by a cross member 64 which is generally in the form of a plate connecting the rear links of the linkage system 52. Thus, the mounting plate 42 and the brackets 50 act as a coupler for the output link (first link 54) and input link (second link 60) in the linkage system 52. The linkage system 52 is configured to guide the movement of the headrest bun 22 from the home position H to a range of forward positions disposed along the path as indicated by arrow F. The movement of the headrest bun 22 between fore and aft positions along the path as indicated by arrow F is powered by an adjustment mechanism shown in the form of a first actuator A1, which is further described below. The first link 54 and the second link 60 are further pivotally coupled to a base plate 70 at pivot points P3, P4, respectively. Pivot point P3 is better shown in FIGS. 12A and 12B. The base plate 70, which can be described as a ground link, is contemplated to extend in a substantially horizontal manner between the pairs of the first and second links 54, 60. In FIG. 3A, a lower portion 66 of second link 60 is shown as coupled to a first side 72 of the base plate 70 at pivot point P4. As noted above, the first link 54, second link 60, and base plate 70 all define links of the linkage system 52 that are rigid members pivotally coupled to one another.

As further shown in FIG. 3A, the first actuator A1 is coupled to a bracket 80 which is further coupled to a bottom wall 74 of the base plate 70. The bracket 80 is contemplated to be a connecting bracket which pivotally couples the first actuator A1 at a pivot point P5 that is yet independent of, the linkage system 52. The first actuator A1 includes a motor 82 which is operably coupled to a spindle or threaded member 84. The threaded member 84 is configured to be driven by the motor 82 in a direction as indicated by arrow 86, such that first actuator A1 is a linear actuator. A connecting tab 88 is disposed on an upper portion of the threaded member 84 and is pivotally connected to a connecting bracket 68 extending outwardly from the cross member 64 of the second link 60 at pivot point P6. With the headrest bun 22 in the home position H, the first actuator A1 is configured to drive the threaded member 84 downward in the direction as indicated by arrow 86 using the motor 82 which is threadingly engaged with the threaded member 84. In this way, the first actuator A1 is configured to drive the headrest bun 22 in a forward direction as indicated by arrow F by drawing the linkage system 52 forward. As the threaded member 84 is driven downward in a direction as indicated by arrow 86, the coupling of the connecting tab 88 to connecting bracket 68 of the second link 60 draws the second link 60 downward to drive the four bar linkage system 52 in a forward direction as further shown in FIGS. 3B-3D. The base plate 70 of the linkage system 52 is contemplated to be a stationary base plate that is pivotally connected to the first and second links 54, 60 at pivot points P3 and P4. With the upwardly extending connecting bracket 80 providing an independent pivoting location P5 for the first actuator A1, the first actuator A1 has a stand-alone pivot location relative to the linkage system 52. In this way, the first actuator A1 can pivot as necessary, in an independent manner relative to the linkage system 52, as the linkage system 52 translates forward and back as the position of the headrest bun 22 is adjusted by a user.

Figure 3B:
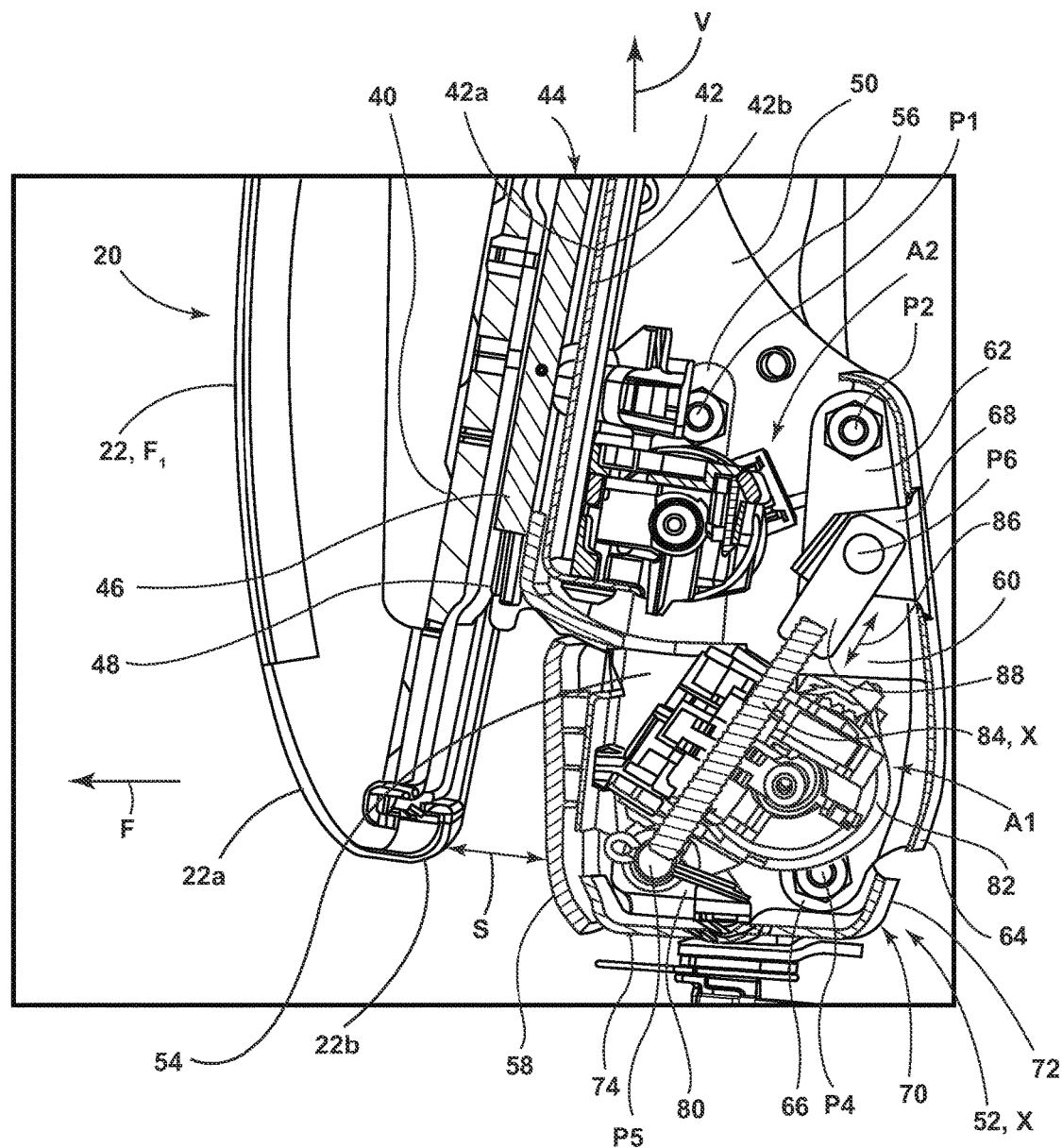
FIG. 3B is a cross-sectional view of the headrest assembly of FIG. 3A with the headrest bun in a forward position relative to FIG. 3A.

Referring now to FIG. 3B, the headrest bun 22 is shown in a forward position $F_1$ which is similar to position $F_1$ shown in FIG. 2B. Thus, a spacing S is shown between the headrest bun 22 and cross member 58 of the first link 54. In FIG. 3B, the threaded member 84 has been driven by the motor 82 of the first actuator A1 in a downward direction as indicated by arrow 86 to a position X. In this way, the linkage system 52 has been driven by the first actuator A1 to a forward position X from the home position H shown in FIG. 3A. Thus, in moving the headrest bun 22 to the forward position $F_1$ the threaded member 84 moves from the home position H (FIG. 3A) to the position X shown in FIG. 3B. Similarly, the linkage system 52 moves from the home position H shown in FIG. 3A to the translated position X shown in FIG. 3B. It is contemplated that forward position F₁ of the headrest bun 22 is approximately one-third of the forward range of movement of the headrest bun 22 of the present concept.

Figure 3C:
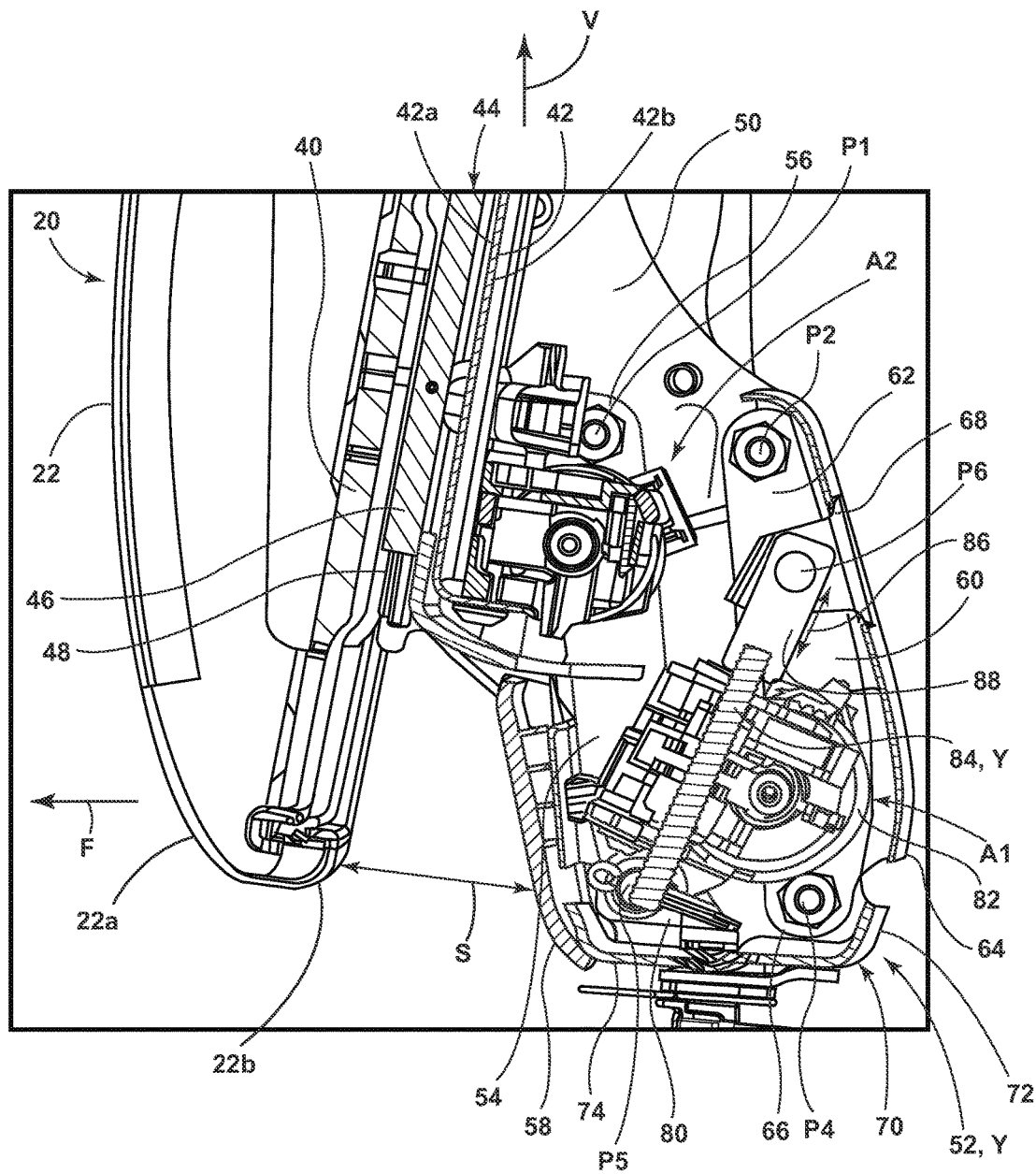
FIG. 3C is a cross-sectional view of the headrest assembly of FIG. 3A with the headrest bun in a forward position relative to FIG. 3B.
Figure 3D:
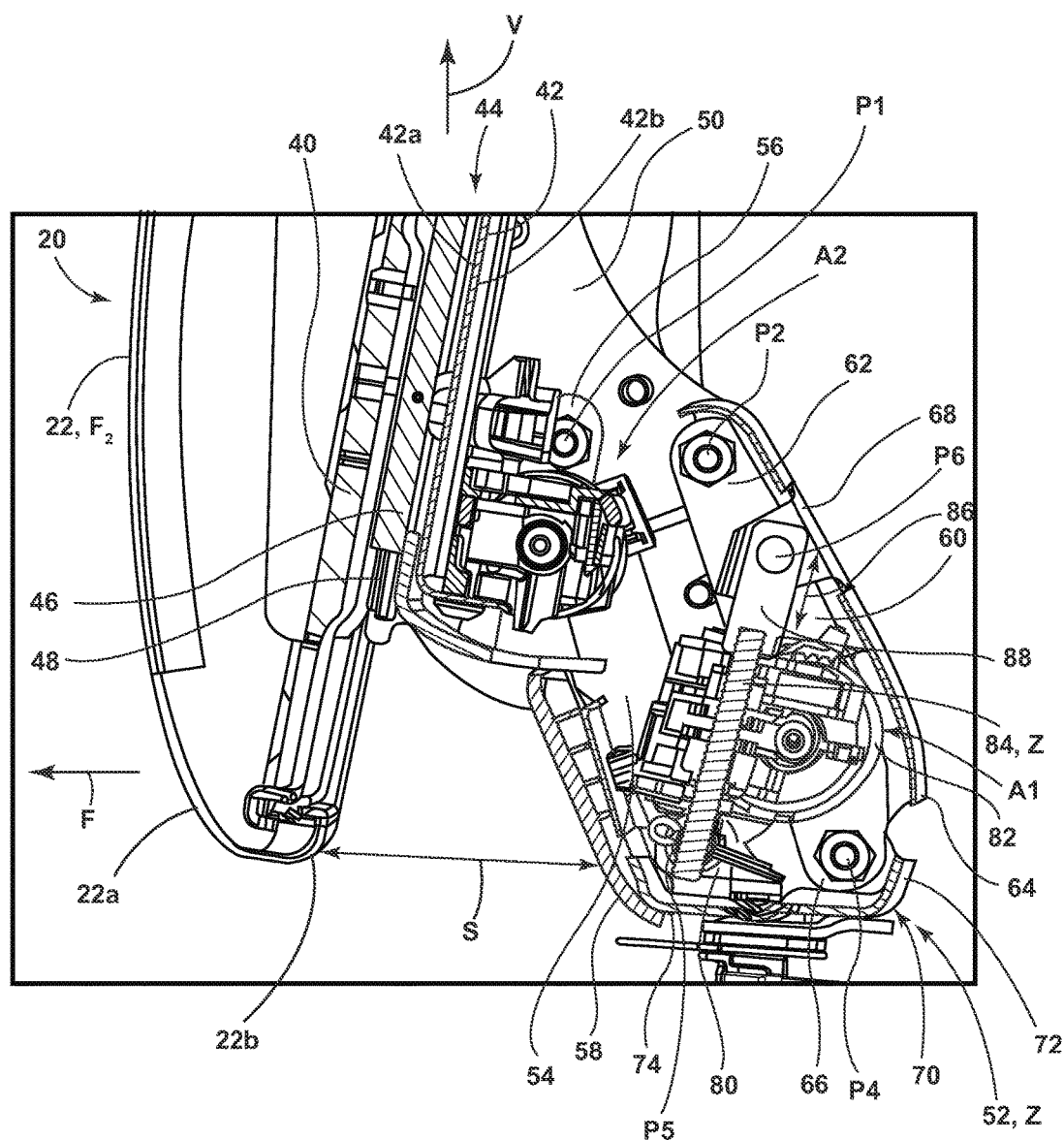
FIG. 3D is a cross-sectional view of the headrest assembly of FIG. 3A with the headrest bun in a forward position relative to FIG. 3C.

Referring now to FIG. 3C, the headrest bun 22 is shown in an intermediate position that is forward of position F₁ shown in FIG. 3B and recessed relative to position F₂ shown in FIG. 3D. In FIG. 3C, the threaded member 84 has been driven by the motor 82 of actuator A1 to a position Y which correlates to the linkage system 52 being translated to a position Y, thereby providing the increased spacing S shown in FIG. 3C relative to FIG. 3B. In the intermediate position, the headrest bun 22 is contemplated to be approximately two-thirds forward with respect to the full range of motion of the headrest bun 22 as driven by the linkage system 52.

Referring now to FIG. 3D, the headrest bun 22 is shown in the forward position F₂ which is similar to position F₂ shown in FIG. 2C. As noted above, the forward position F₂ is contemplated to be a forward most position for the headrest bun 22, such that the spacing S is contemplated to be maximized in the representation of FIG. 3D. Thus, as shown in FIG. 3D, threaded member 84 has been driven by the motor 82 of actuator A1 to a position Z which correlates to a full forward position Z of the linkage system 52. As noted above, it is contemplated that the forward position F₂ of the headrest bun 22 can be approximately a 50 mm extension as compared to the home position H shown in FIG. 3A. The linkage system 52 of the present concept provides for a controlled movement of the headrest bun 22 between the forwardmost position or extended position F₂ and the home position H. The threaded member 84 provides for infinite incremental movement of the headrest bun 22 within the range of positions between the extended and recessed positions of the headrest bun 22.

Figure 4:
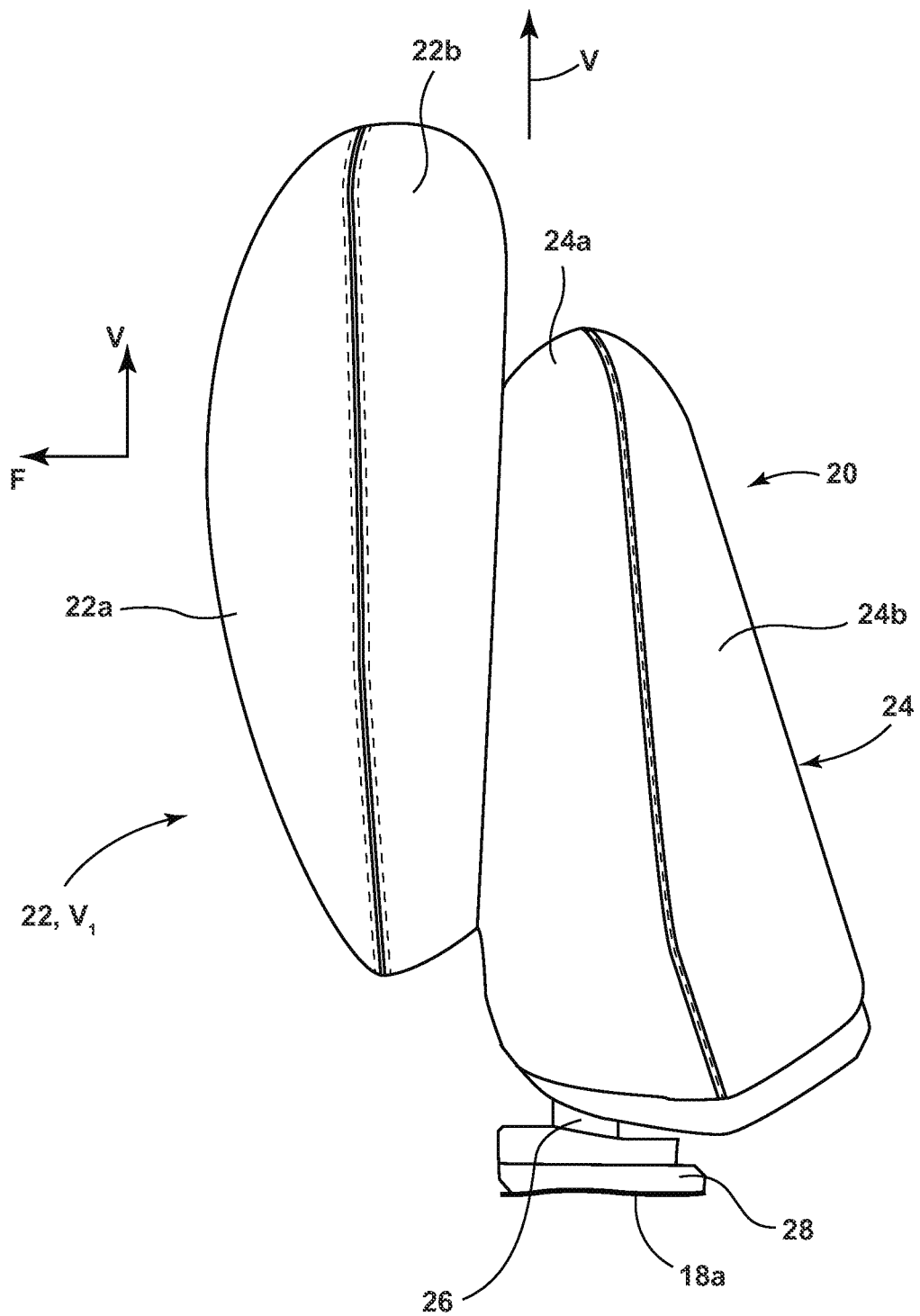
FIG. 4 is a side elevational view of the headrest assembly of FIG. 2A showing the headrest bun in an upward position relative to FIG. 2A.

Referring now to FIG. 4, the headrest bun 22 is shown in a vertical position V₁ indicating upward movement along the path as indicated by arrow V from the home position H shown in FIG. 2A. As noted above, the headrest bun 22 is contemplated to move vertically relative to the rear trim cover 24 using a second actuator A2 (FIG. 3A) configured to drive the headrest bun 22 as guided along the channel and rail arrangement 44 (FIG. 3A). Movement of the headrest bun 22 in a direction as indicated by arrow V is contemplated to be approximately 50 mm from the home position H to the vertical most position. Other ranges of vertical movement for the headrest bun 22 are also contemplated by the present concept.

Referring now to FIG. 5, a rearview of the mounting plate 42 is shown as coupled to the headrest bun 22. The telescoping cover 30 is shown in FIG. 5 having the front portion 30*a* and rear portion 30*b*, wherein the front portion 30*a* is telescopingly received within the rear portion 30*b*. The rear portion 30*b* further includes an upper mounting surface 32 having a plurality of mounting apertures 34. The mounting apertures 34 are used to mount the rear portion 30*b* of the telescoping cover 30 to the rear trim cover 24. The mounting plate 42 is shown with the rear side 42*b* having brackets 50 extending outwardly therefrom. The second actuator A2 is shown mounted on the second surface 42*b* of the mounting plate 42 and includes a motor 100 configured to drive a drive shaft 102 in a rotating manner as indicated by arrow R1. The drive shaft 102 is contemplated to be a threaded member including a continuous spiral thread disposed therealong such as a worm screw configuration known in the art. The second actuator A2 is configured to be powered by a power supply line 104 shown in FIG. 5 which is contemplated to be coupled to an electrical system of a vehicle in which the headrest assembly 20 is disposed. The drive shaft 102 is gearingly coupled to a mounting bracket 110 at a ferrule portion 112 of the mounting bracket 110. The ferrule portion 112 is contemplated to be an internally threaded member that corresponds to and matingly engages with the threads of the drive shaft 102 to translate the mounting bracket 110 vertically in the direction as indicated by arrow V. The mounting bracket 110 includes a mounting portion 114 which extends outwardly from the ferrule portion 112 to align with an access aperture 42*c* disposed through the mounting plate 42 at a central portion thereof. The mounting portion 114 of mounting bracket 110 further includes mounting screws 116 which are configured to couple the mounting bracket 110 to the support plate 40 of the headrest bun 22 which is shown through access aperture 42*c* of the mounting plate 42.

Thus, the mounting bracket 110 is configured to translate along a length of the drive shaft 102 as driven by the motor 100 of the second actuator A2 to move the headrest bun 22 in a vertical direction as indicated by arrow V between raised and lowered positions (FIGS. 2A and 4, respectively) as coupled to the support plate 40 of the headrest bun 22.

Figure 6:
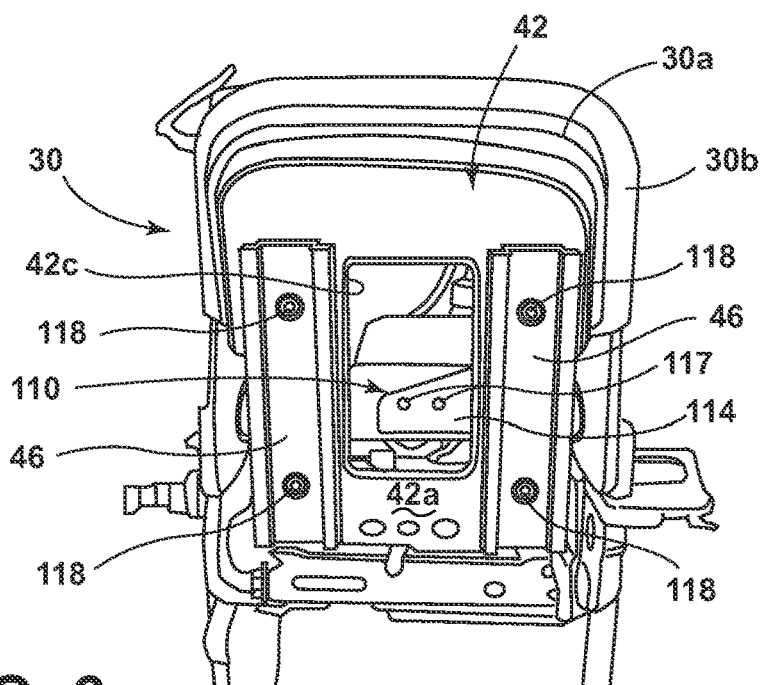
FIG. 6 is a top perspective view of a mounting plate having guide rails disposed thereon.

Referring now to FIG. 6, dual channels 46 are shown coupled to the front side 42*a* of the mounting plate 42 by fasteners 118. The channels 46 are disposed on opposite sides of the access aperture 42*c* which is centrally located on the mounting plate 42. Mounting bracket 110 is shown aligned with access aperture 42*c*, wherein the mounting portion 114 of the mounting bracket 110 includes mounting apertures 117 configured to receive mounting screws 116 shown in FIG. 5 to couple the support plate 40 thereto.

Figure 7:
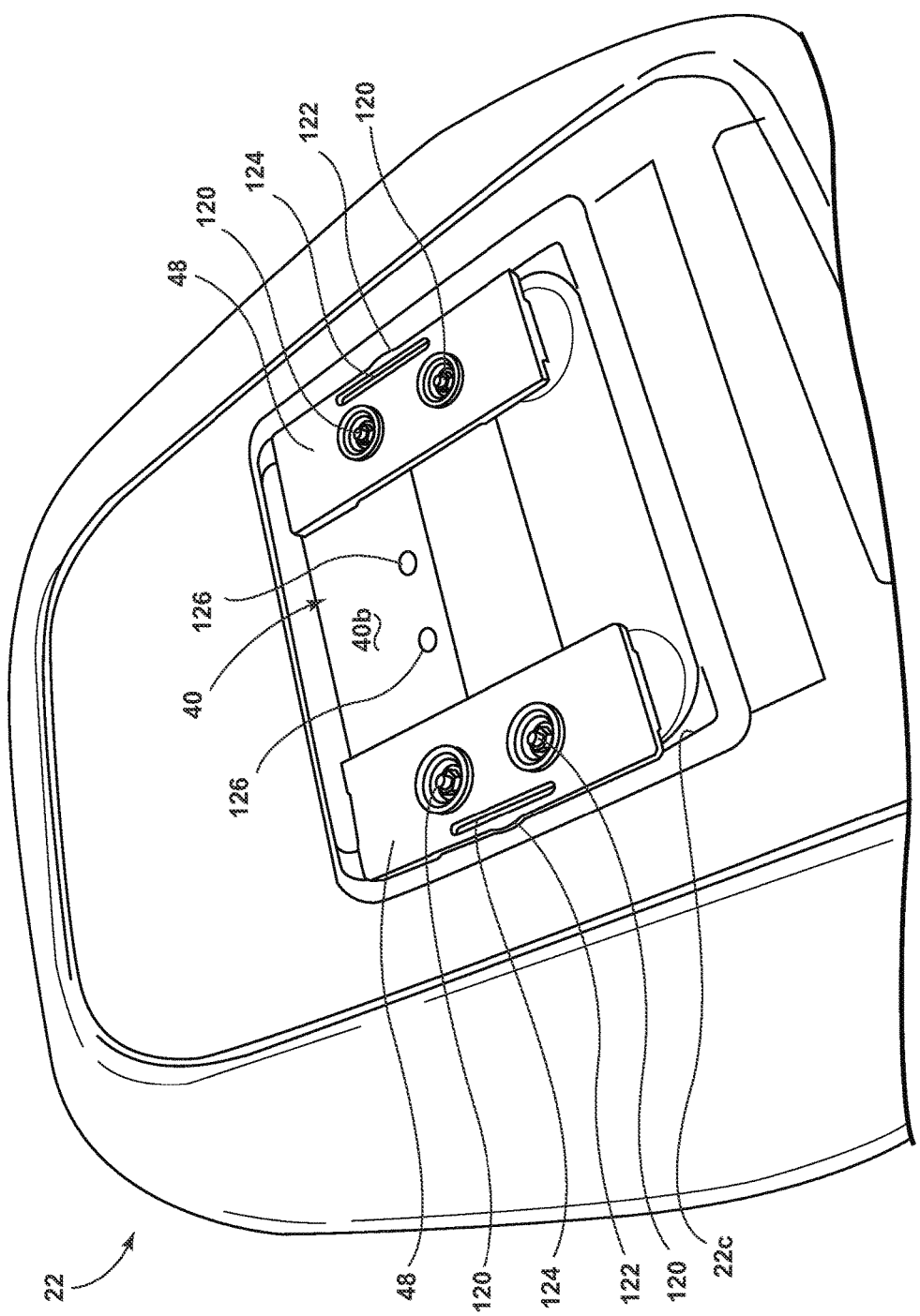
FIG. 7 is a rear perspective view of a headrest bun having mounting brackets disposed thereon.

Referring now to FIG. 7, the headrest bun 22 is shown in a rearview, wherein the rear portion 22*b* substantially covers the support plate 40. A rear surface 40*b* of the support plate 40 is shown through an aperture 22*c* disposed in the rear portion 22*b* of the headrest bun 22. Rails 48 are mounted on the rear surface 40*b* of support plate 40 on opposite sides thereof via fasteners 120. The rails 48 include a cross-section configured to mate with a cross-section of the channels 46 mounted to the mounting plate 42 as shown in FIG. 6. The rails 48 include detent features 122 disposed adjacent to a slot 124 which are configured to provide a frictional engagement with the channels 46, such that vertical movement of the headrest bun 22 is more controlled in the slideable arrangement in the rail and channel system 44 (FIG. 3A). The detent features 122 are contemplated to be flexibly resilient to provide constant frictional pressure on the channels 46 in which the rails 48 are slideably received. As further shown in FIG. 7, the rear surface 40*b* of support plate 40 includes mounting apertures 126 which are configured to align with the mounting apertures 117 of mounting bracket 110, for mounting the support plate 40 to the mounting bracket 110 as shown in FIG. 5. In this way, the second actuator A2 (FIG. 5) is able to translate the mounting bracket 110 in a vertical movement as indicated by arrow V along drive shaft 102 which translates into manner of the headrest bun 22 between raised and lowered positions via a mounting of the mounting bracket 110 to the rear surface 40*b* of support plate 40 through the access aperture 42*c* of mounting plate 42. With specific reference to FIGS. 6 and 7, the dual channel system provides the stability necessary to power the vertical movement of the headrest bun 22 in a guided linear manner for consistent and straight vertical movement.

Figure 8:
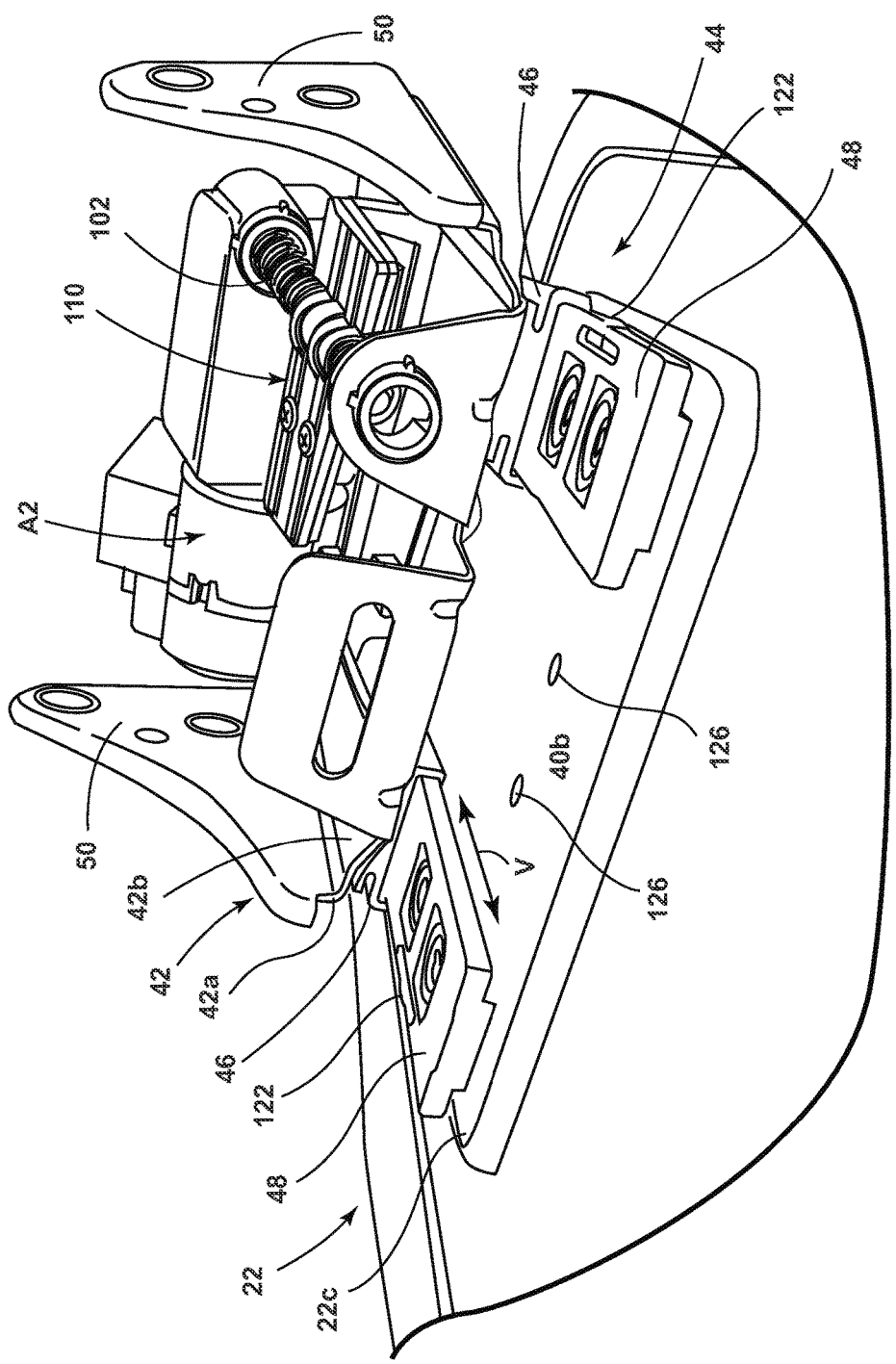
FIG. 8 is a rear perspective view of the brackets of FIG. 7 shown disposed in the guide rails of FIG. 6.

Referring now to FIG. 8, the rails 48 are shown being received within the channels 46 which are mounted to the mounting plate 42. As noted above, the channels 46 are mounted to the front side 42*a* of the mounting plate 42. The rails 48, as noted above, are slideably received in the channels 46 with the flexibly resilient detent features 122 providing constant pressure on side walls of the channels 46 for controlling movement in the vertical direction as indicated by arrow V of the headrest bun 22.

Figure 9B:
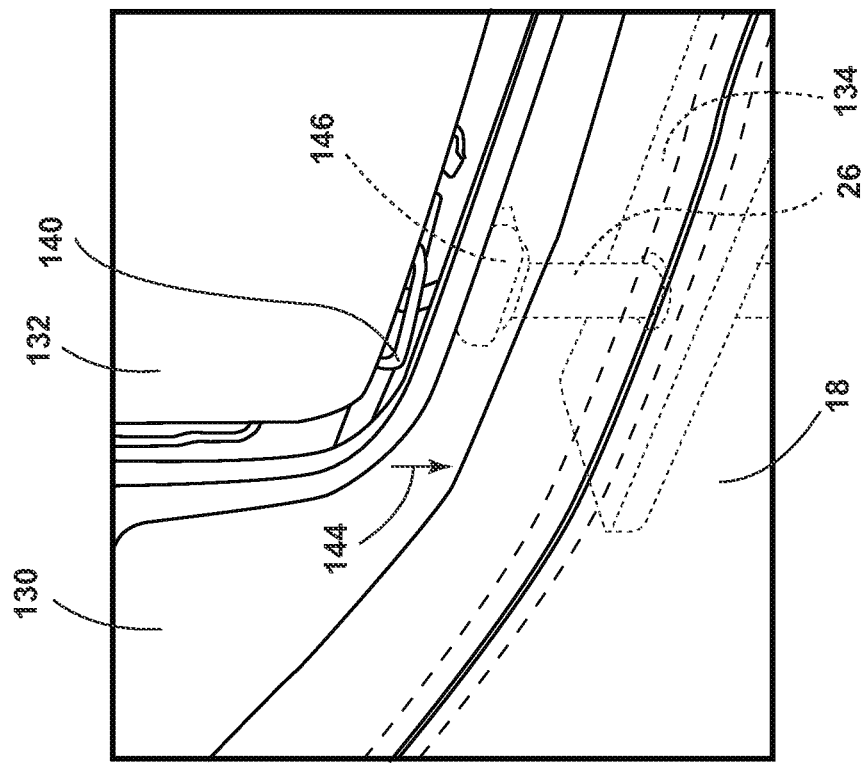
FIG. 9B is a front perspective view taken at location 9B of FIG. 9A.
Figure 9A:
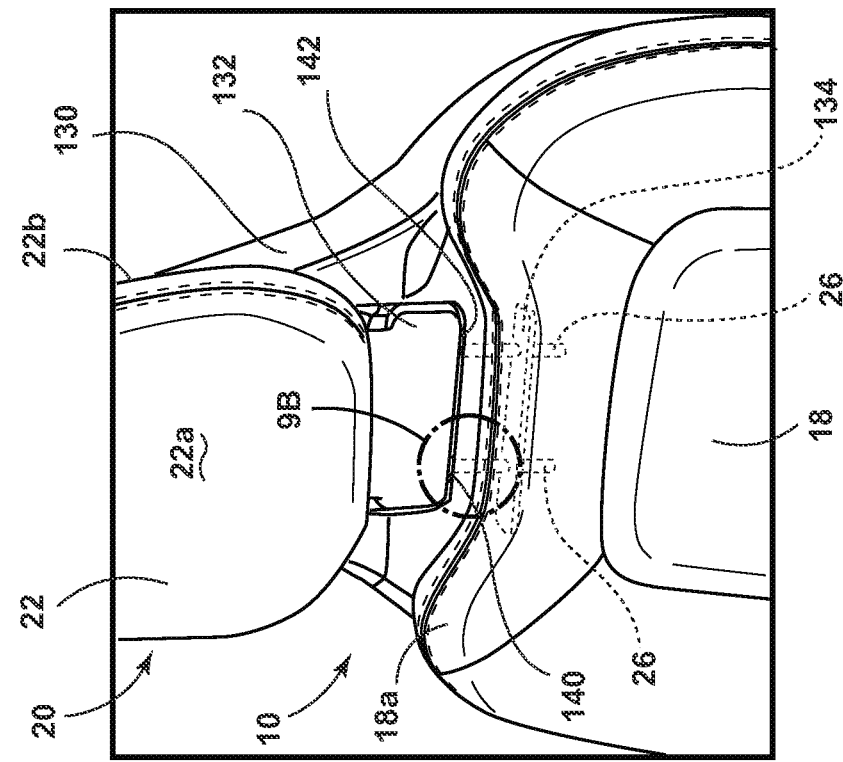
FIG. 9A is a front perspective view of a headrest assembly disposed on a seatback.

Referring now to FIG. 9A, the headrest assembly 20 is shown disposed on and coupled to the upper portion 18a of seatback 18 of vehicle seat 10. In the embodiment shown in FIG. 9A, a shroud 130 generally surrounds the connection of the headrest assembly 20 to the seatback 18. The headrest assembly 20, in FIG. 9A, further includes a base portion 132 which is a cover that generally conceals framing and supporting structures of the headrest assembly 20. As shown in phantom in FIG. 9A, support posts 26 are twin support posts which are received in seatback frame member 134 of the seatback 18. It is contemplated that the support posts 26 can be slideably received in the seatback frame member 134 and vertically adjustable as received therein. The headrest assembly 20 is configured to lock into place on the seatback 18 and is further configured for quick disconnect or disassembly of the headrest assembly 20 from the seatback 18. First and second release tabs 140, 142 are operably coupled to the seatback frame member 134 and are associated with the individual supports posts 26 for quick release of the headrest assembly 20 from the seatback 18. With reference to FIG. 9B, the release tab 140 is shown associated with support post 26 as received in seatback frame member 134 of the seatback 18. The release tab 140 is configured to move in a downward direction as indicated by arrow 144 to release a locking mechanism 146 associated with support posts 26 and seatback frame member 134. The locking mechanism 146 is configured to retain the support post 26 no the seatback frame 28. Thus, when the release tabs 140, 142 (FIG. 9A) are simultaneously pressed, associated locking mechanisms, such as locking mechanism 146, will release from a locked condition relative to the support posts 26, such that the headrest assembly 20 can be lifted and removed from the seatback 18. The locking mechanism 146 and release tab 140 are contemplated to be structural members operably coupled to the seatback 18 at a portion of the seatback frame 28, such as seatback frame member 134. It is noted that the seatback frame member 134 shown in FIGS. 9A and 9B is exemplary only and may include any number of structural components and configurations to adequately support the support posts 26 and further support use of the headrest assembly 20 by a user.

Figure 10A:
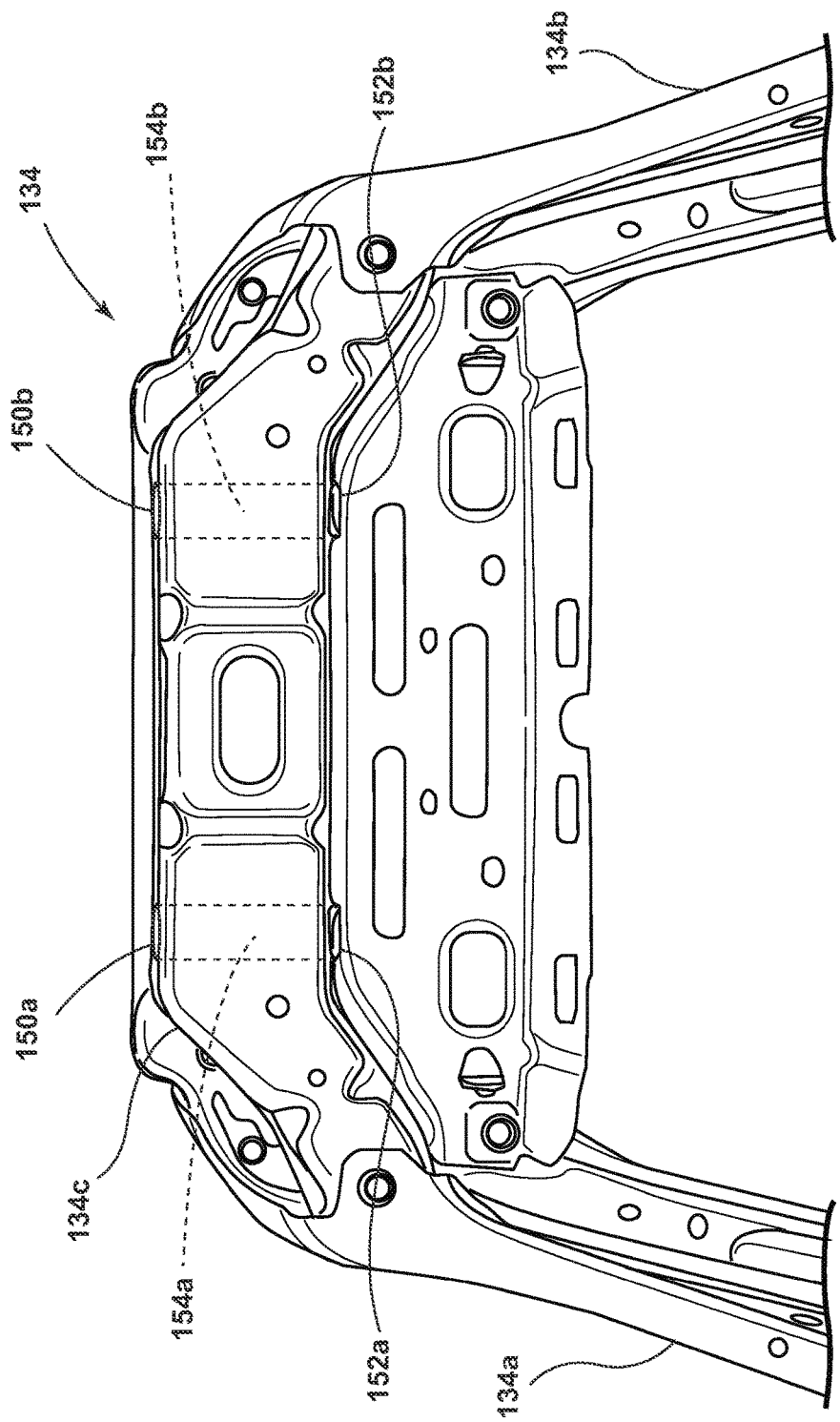
FIG. 10A is a front perspective view of a seatback frame member.

Referring now to FIG. 10A, an upper portion of a seatback frame 134 is shown, wherein the seatback frame 134 includes first and second side members 134a, 134b which are interconnected by a cross member 134c. The cross member 134c includes upper mounting apertures 150a, 150b which are configured to align with lower mounting apertures 152a, 152b. The upper and lower mounting apertures 150a, 150b and 152a, 152b are configured to receive the support posts 26 to support the headrest assembly 20 from the seatback frame 134. The support posts 26 are configured to be received in channels 154a, 154b disposed between the upper and lower mounting apertures 150a, 150b and 152a, 152b, and further defined by guide inserts as described below.

Figure 10B:
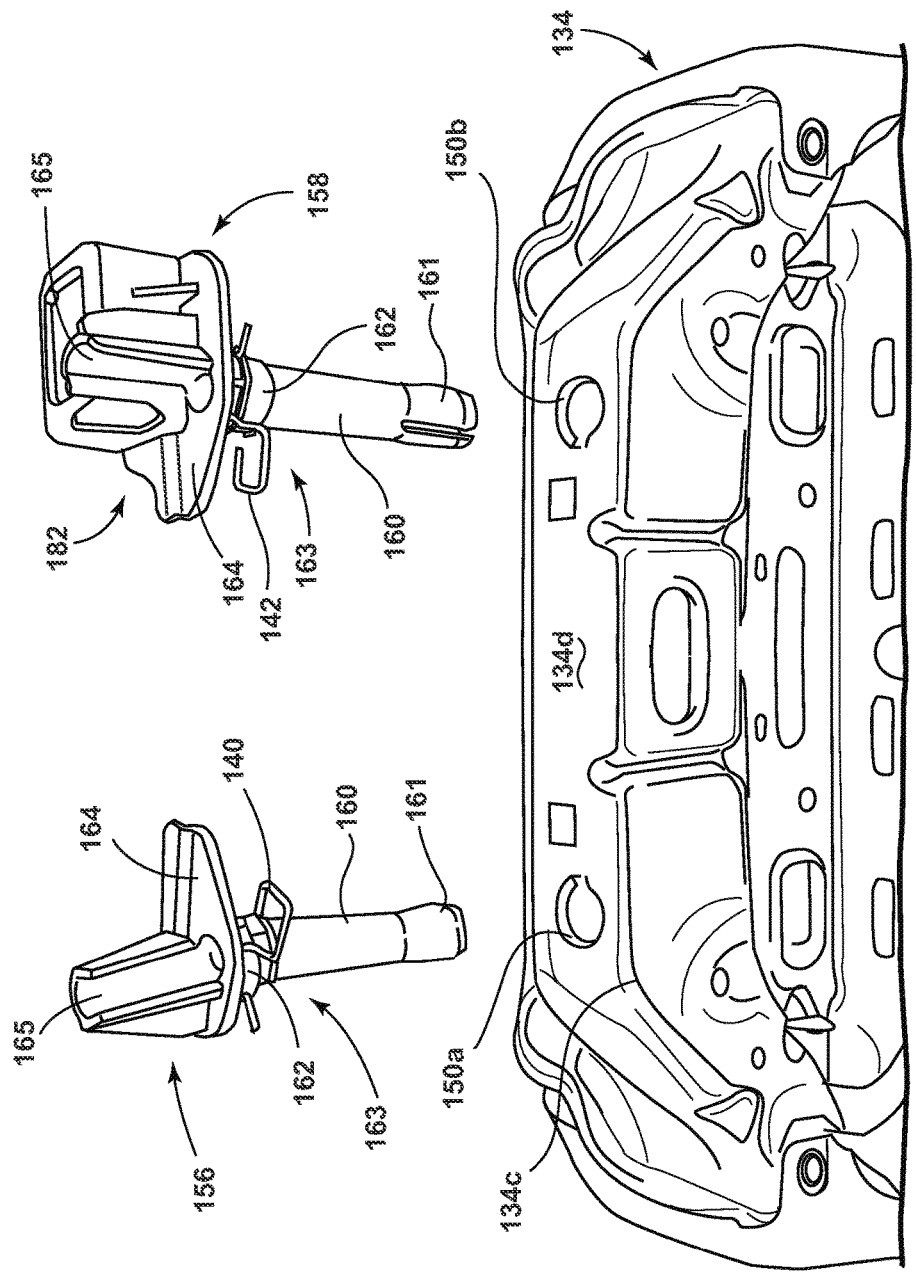
FIG. 10B is a front perspective view of first and second guide inserts exploded away from the seatback frame member of FIG. 10A.

Referring now to FIG. 10B, guide inserts 156, 158 are configured to be received in the upper mounting apertures 150a, 150b and each include guide sleeves 160 having flexibly resilient lower locking features 161 configured to lock against lower mounting apertures 152a, 152b. The guide inserts 156, 158 are contemplated to be polymeric inserts having recesses 162 in which clips 163 are received. The clips 163 included the release tabs 140, 142, as described above, such that the clips 163 define the locking mechanisms 146, also described above. The clips 163 are used to lock the support posts 26 in place in the guide inserts (156 or 158) which are securely mounted to the frame member 134. The guide inserts 156, 158 further include abutment portions 164 having semicircular guide members 165 extending upwardly therefrom. The abutment portions 164 are configured to be abuttingly supported from an upper surface 134d of the seatback frame 134. As shown in FIG. 10B, guide insert 158 further includes a support feature 182 configured to receive a receptacle for electrically connecting components of the headrest assembly 20, as further described below.

Referring now to FIG. 10C, the guide inserts 156, 158 are shown inserted into the cross member 134c of the seatback frame 134 at upper mounting apertures 150a, 150b. The abutment portions 164 are shown aligned with the upper surface 134d of the seatback frame 134, as well as an upper lip portion 134e of the seatback frame 134. With the guide inserts 156, 158 fully inserted on the seatback frame 134, the headrest assembly 20 can now be received.

Figure 10D:
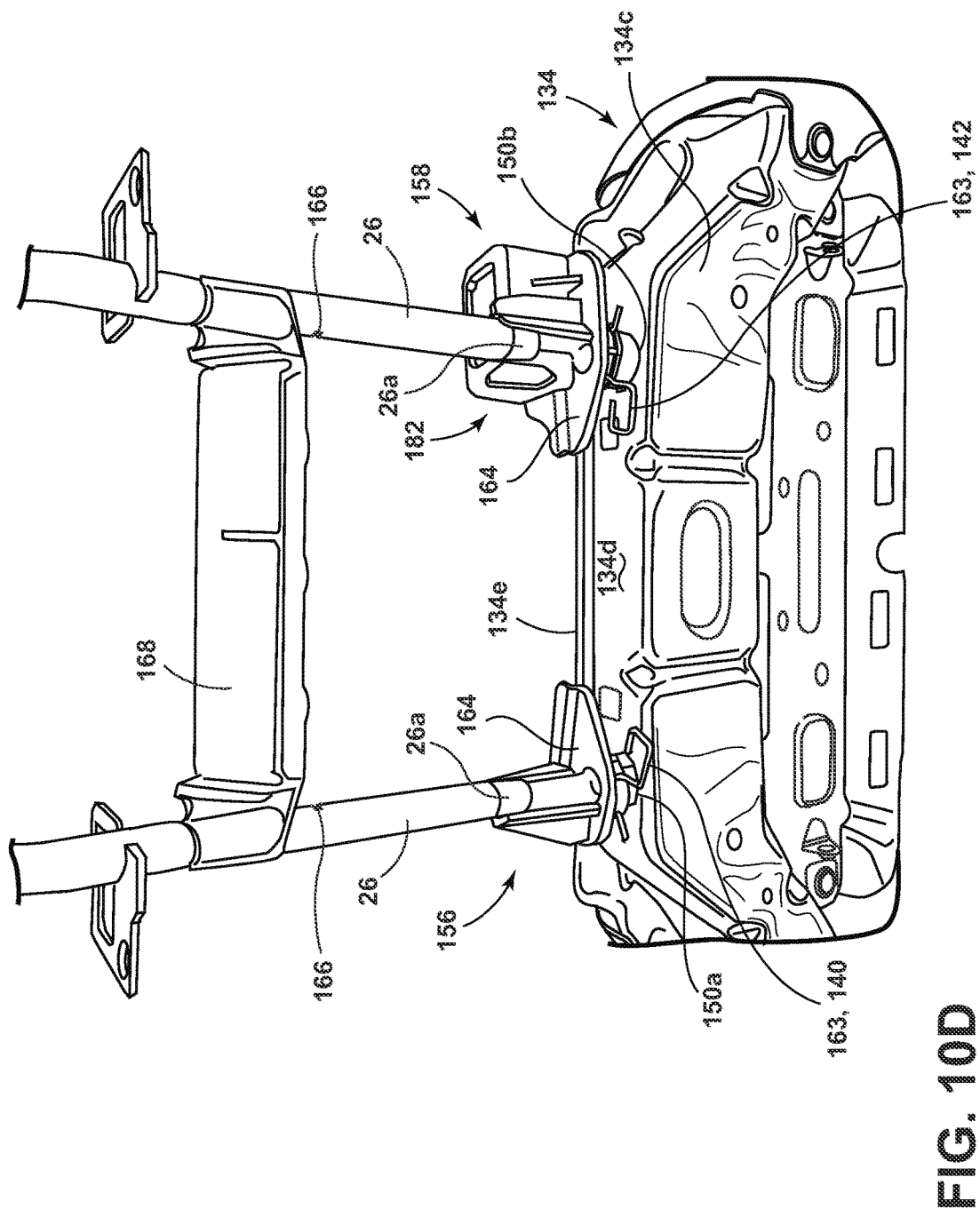
FIG. 10D is a front perspective view of first and second support posts being received in the first and second guide inserts of FIG. 10C.

Referring now to FIG. 10D, the support posts 26 are shown having a interconnecting brace member 168 coupled therebetween. Lower portions 26a of the support posts 26 are shown received in the semicircular guide members 165 of the guide inserts 156, 158. The support posts 26 further include notches 166 which are configured to receive portions of the clips 163 for locking the support posts 26 in place on the seatback frame 134.

Figure 10E:
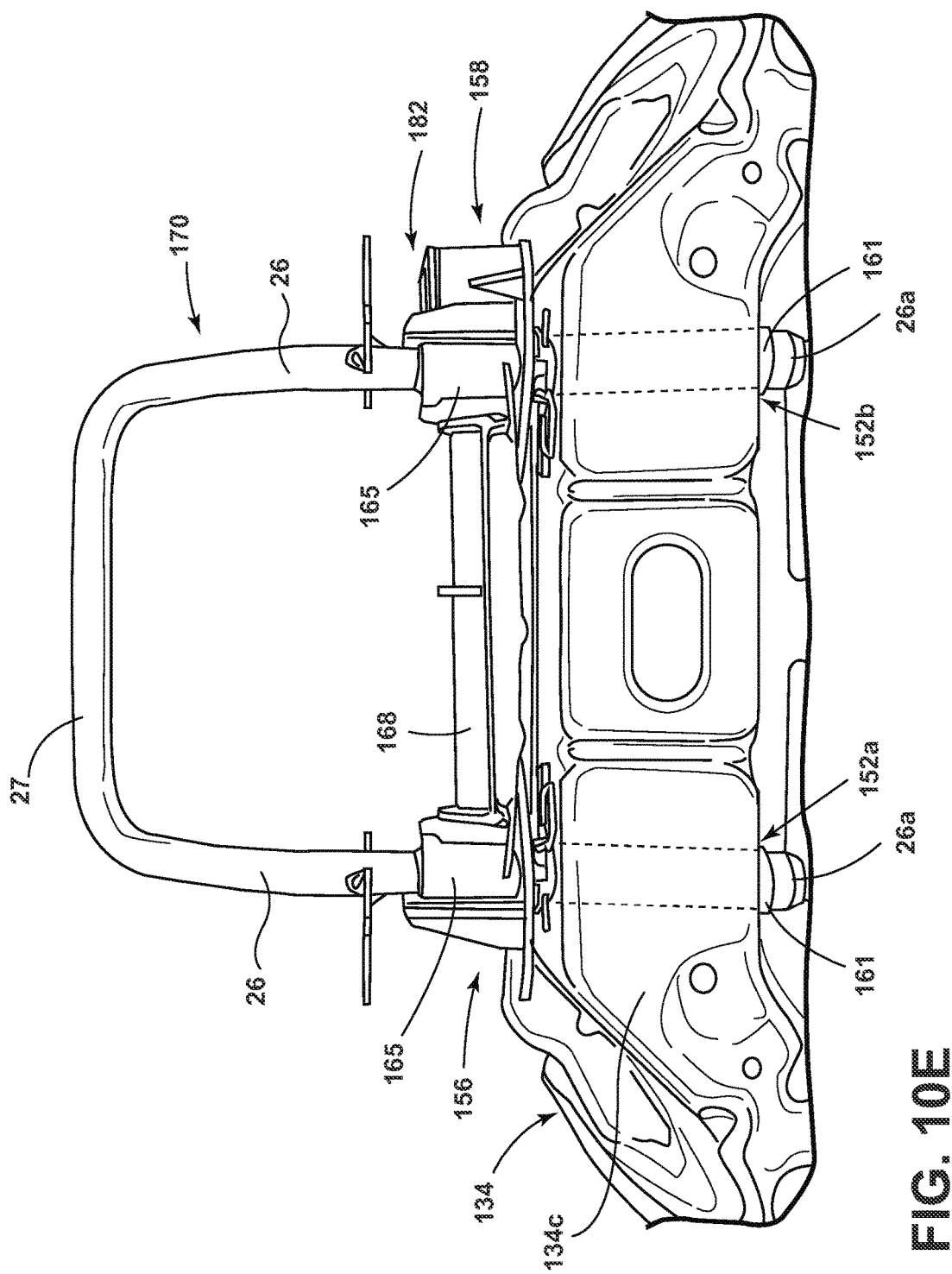
FIG. 10E is a front perspective view of first and second support posts fully received in the first and second guide inserts of FIG. 10D.

Referring now to FIG. 10E, the support posts 26 are shown fully received in the guide inserts 156, 158. Lower portions 26a of the support posts 26 are shown received through the lower mounting apertures 152a, 152b at lower locking features 161 of the guide inserts 156, 158. The support posts 26 further include an upper cross member 27 interconnecting the posts 26 and which defines a support structure 170, as further described below. In FIG. 10E, the support structure 170 is fully mounted on the seatback frame 134 and configured to support the headrest assembly 20 of the present concept.

Referring now to FIG. 11A, a portion of the headrest assembly 20 is shown with the mounting plate 42 coupled to the telescoping cover 30. The support posts 26 are shown having an upper cross member 27 that interconnects the support posts 26 to define a unitary support structure 170 that generally includes an inverted U-shaped configuration culminating in the twin support posts 26. In FIG. 11A, the right support post 26 includes a mounting tab 172 operably coupled thereto by a fastening means, such as welding. Power supply line 174 is shown having a mounting feature 176 that is mounted to the mounting tab 172. On an opposite side of the mounting tab 172 relative to the mounting feature 176, a power plug 178 is disposed and configured for reception in a power receptacle 180. The power receptacle 180 is mounted on a support feature 182 which is contemplated to be a polymeric part that is rigidly coupled to the seatback frame in assembly. As such, the support feature 182 and receptacle 180 remain stationary within the seatback 18 of the vehicle seat 10 for receiving the power plug 178 of the headrest assembly 20. As best shown in FIG. 11B, support post 26 is received the semicircular guide member 165, which is an integral structure with the support feature 182. In this way, when the twin support posts 26 are received in the seatback frame 28, power plug 178 will align with receptacle 180 for an electrical connection that is made when the headrest assembly 20 is moved in a downward direction as indicated by arrow 190 when the headrest assembly 20 is fully seated (FIG. 1) on the seatback 18. When the power connection is made by the power plug 178 being received in the receptacle 180, power from the power supply line 174 is directed as necessary within the headrest assembly 20 for powering the powered components thereof, such as the first and second actuators A1, A2. With the support feature 182 securely mounted on a frame member of the seatback 18, the guided reception of the support posts 26 ensures a proper alignment of the power plug 178 with receptacle 180 for a fast and consistent electrical connection when the headrest assembly 20 is fully received on the seatback 18, such as shown in FIG. 1. Thus, the headrest assembly 20 includes a power clip assembly 184 having a first portion 186, which is coupled to a support post 26 and includes power plug 178, and a second portion 188, which is coupled to the seatback frame 28 and includes receptacle 180. In FIG. 11B, the power clip assembly 180 is shown in a disconnected condition and is further shown in a connected condition in FIGS. 12C and 12D. With the quick disconnect features described above, the headrest assembly 20 can be removed from the seatback 18 in a straight upward movement when the locking mechanisms 146 (FIG. 9B) are released from the support posts 26, such that the upward movement of the headrest assembly 20 will disconnect the headrest assembly 20 both mechanically, at support post 26, and electrically, at power plug 178 and receptacle 180, from the seatback 18. Thus, the present concept provides a multi-configurational headrest assembly 20 that is easily installed and removed from a seatback in both a mechanical and electrical manner. It is further contemplated that either the power plug 178 or the receptacle 180 can be disposed on the first portion 186 of the power clip assembly 184, with the opposite and reciprocal connection feature disposed on the second portion 188.

Referring now to FIG. 12A, the linkage system 52 of the headrest assembly 20 is shown with the rear trim cover 24 and the headrest bun 22 removed from the headrest assembly 20. In FIG. 12A, the linkage system 52 is in the home position H which represents a recessed or retracted position, wherein the headrest bun 22 would be disposed adjacent the rear trim cover 24, such as shown in FIG. 2A. With the headrest bun 22 removed, the support plate 40 is shown having mounting apertures 121 for mounting the rails 48 thereon using fasteners 120 as shown in FIG. 7. Centrally disposed mounting apertures 126 are further shown in FIG. 12A and are used to couple the support plate 40 to the mounting bracket 110 as shown in FIG. 5. The first side or front side 40a of support plate 40 is configured to couple to the headrest bun 22 and be driven by second actuator A2 in a vertical direction as indicated by arrow V for vertical adjustment of the headrest bun 22. As further shown in FIG. 12A, the mounting plate 42 is coupled to the support plate 40 and includes rearwardly extending dual brackets 50 having pivot points P1, P2 for pivotally coupling the first link 54 and second link 60. The second link 60 is shown pivotally coupled to the base plate 72 at pivot point P4 and the first link 54 is shown operably coupled to the base plate 72 at pivot point P3 disposed on a mounting bracket 73 extending upward from the base plate 72. The support structure 170 is shown having support rods 26 extending therefrom for coupling the headrest assembly 20 in a quick disconnect and supported position to seatback frame member 134.

Referring now to FIG. 12B, the linkage system 52 is shown in the fully extended position Z, wherein the support plate 40 is fully extended away from the support structure 170. In the fully extended position Z, the linkage system 52 reveals cross member 58 which interconnects twin pairs of the first links 54 as described above. The mounting plate 42, the first and second links 54, 60, and the base plate 72 are contemplated to be unitary parts which are rigid members that are pivotally connected to one another at pivot points (P1-P4) to provide extension of the support plate 40 between retracted and extended positions. In the position shown in FIG. 12B, the support plate 40 correlates to the headrest bun 22 being in the fully extended position $F_2$ as shown in FIG. 3D.

Figure 12D:
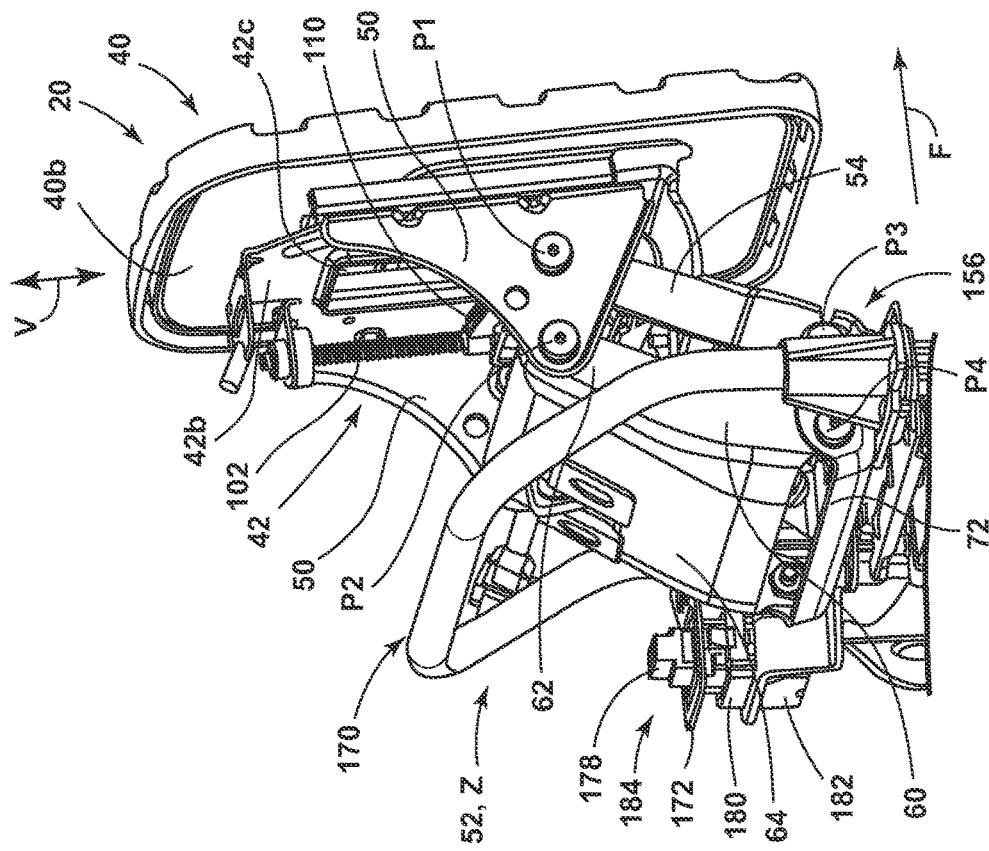
FIG. 12D is a rear perspective view of the headrest assembly of FIG. 12B.
Figure 12C:
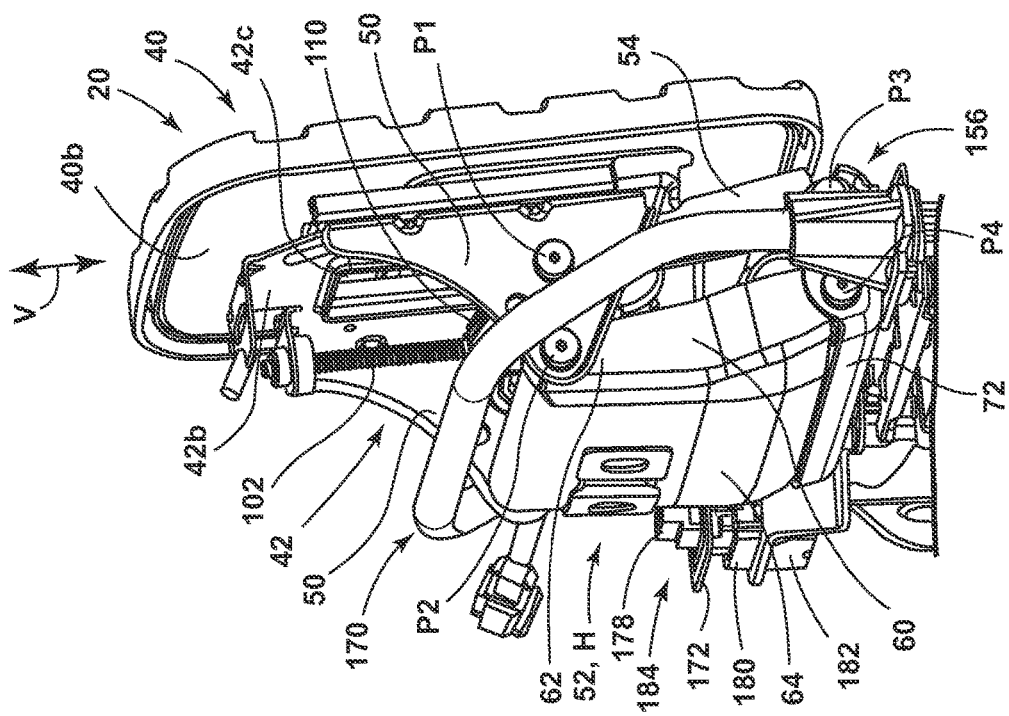
FIG. 12C is a rear perspective view of the headrest assembly of FIG. 12A.

Referring now to FIG. 12C, the headrest assembly 20 is shown with the linkage system 52 in the home position H as shown in FIG. 12A. The second link 60 is shown as a unitary plate, wherein the dual second links 60 are interconnected by cross member 64. In FIG. 12C, the mounting plate 42 is shown having dual brackets 50 extending rearwardly therefrom for pivotally connecting the first and second links 54, 60 at pivot points P1, P2.

With reference to FIG. 12D, the linkage system 52 is in the fully extended position Z with the support plate 40 in the lowered position. FIG. 12D is a rear view of the headrest assembly 20 as shown in FIG. 12B. In FIGS. 12C and 12D, the drive shaft 102 (powered by actuator A2 as shown in FIG. 5) is shown coupled to the mounting plate 42 and is further coupled to the mounting bracket 110 for vertical movement in the direction as indicated by arrow V. As noted above, and shown in FIG. 5, the mounting bracket 110 is coupled to the support plate 40 for moving the support plate 40 through a mechanical connection made through access aperture 42c disposed through the mounting plate 42. Thus, access aperture 42c is contemplated to be of sufficient vertical length to accommodate full vertical movement of the headrest bun 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
   a seatback having a seatback frame;
   one or more support posts removeably received in a portion of the seatback frame;
   a headrest assembly supported on the one or more support posts, the headrest assembly comprising:
      a linkage system including a mounting plate;
      a first adjustment mechanism coupled to the linkage system for driving the linkage system between extended and retracted positions;
      a second adjustment mechanism coupled to the mounting plate and further coupled to a headrest bun through an access aperture disposed through the mounting plate, wherein the second adjustment mechanism drives the headrest bun between raised and lowered positions relative to the mounting plate; and
   a power clip assembly having a first portion disposed on the one or more support posts and a second portion disposed on the seatback frame, wherein power is provided to the first and second adjustment mechanisms when the first portion of the power clip assembly is electrically coupled to the second portion of the power clip assembly.

2. The vehicle seat of claim 1, including:
   a telescoping cover assembly operable between stowed and deployed positions and configured to substantially conceal the linkage system as the linkage system moves between the extended and retracted positions.

3. The vehicle seat of claim 2, wherein the telescoping cover assembly includes a first portion and a second portion, and further wherein the first portion extends outwardly from the second portion in the deployed position and the first portion is partially nested with the second portion when the telescoping cover is in the stowed position.

4. The vehicle seat of claim 1, wherein one of the first portion, the second portion and both the first and second portions of the power clip assembly include a guide sleeve configured to receive the one or more support posts of the headrest assembly.

5. The vehicle seat of claim 4, wherein the first portion of the power clip assembly includes a power plug and further wherein the second portion of the power clip assembly includes a receptacle configured to receive the power plug in a connected configuration.

6. The vehicle seat of claim 1, wherein the one or more support posts include first and second support posts having first and second locking mechanisms disposed on the seatback frame associated therewith, the first and second locking mechanisms configured to retain the first and second support posts on the seatback frame when the headrest assembly is received on the seatback frame.

7. The vehicle seat of claim 6, wherein the first and second locking mechanisms each include release tabs operably coupled thereto and configured to release the locking mechanisms from a locked condition to remove the headrest assembly from the seatback frame.

8. The vehicle seat of claim 1, wherein the linkage system further includes a base plate and first and second links, wherein the first and second links pivotally interconnect the mounting plate and the base plate.

9. The vehicle seat of claim 8, wherein the adjustment mechanism is pivotally coupled to the base plate and the second link.

10. A headrest assembly, comprising:
    a linkage system having a first adjustment mechanism for powering fore and aft movement of a mounting plate;
    a headrest bun having a support plate slideably coupled to the mounting plate; and
    a second adjustment mechanism operably coupled between the mounting plate and the headrest bun through an access aperture disposed through the mounting plate for powering vertical movement of the headrest bun relative to the mounting plate.

11. The headrest assembly of claim 10, wherein the support plate of the headrest bun is slideably coupled to the mounting plate by a rail and channel arrangement.

12. The headrest assembly of claim 11, wherein the mounting plate includes first and second sides and further wherein the first side of the mounting plate includes first and second channels coupled thereto on opposite sides of the access aperture.

13. The headrest assembly of claim 12, wherein the support plate includes first and second sides and further wherein the second side of the support plate includes first and second rails coupled thereto and configured to be slideably received in the first and second channels of the mounting plate.

14. The headrest assembly of claim 13, including:
    a rear trim cover, and
    a telescoping cover assembly having first and second portions, the telescoping cover assembly operable between stowed and deployed positions relative to the fore and aft movement of the linkage system, wherein the first portion of the cover assembly is coupled to the second side of the mounting plate, and further wherein the second portion of the cover assembly is operably coupled to the rear trim cover.

15. A headrest assembly, comprising: a linkage system comprising a base plate and a mounting plate pivotally interconnected by first and second links; an actuator operably coupled to the linkage system for translating the linkage system between extended and retracted positions; and a cover assembly operable between stowed and deployed positions and having a first portion that is partially nested within a second portion when the cover assembly is in a stowed position, wherein the actuator is a linear actuator pivotally coupled between the base plate and one of the first and second links, wherein the actuator includes a threaded member having a mounting tab disposed thereon which is pivotally coupled to the second link.

16. The headrest assembly of claim 15, wherein the actuator pivots independently of one or more pivot axes of the linkage system when driving the linkage system between extended and retracted positions.

17. The headrest assembly of claim 15 wherein the first portion extends outwardly from the second portion in the deployed position.

18. The headrest assembly of claim 17, including:
a headrest bun slideably coupled to a first side of the mounting plate, wherein the front portion of the cover assembly is coupled to a second side of the mounting plate.

* * * * *